(12) United States Patent
Huang et al.

(10) Patent No.: US 7,760,258 B2
(45) Date of Patent: Jul. 20, 2010

(54) APPARATUS AND METHOD FOR STABILIZING IMAGE SENSOR BLACK LEVEL

(75) Inventors: Ying Huang, Newbury Park, CA (US); Giuseppe Rossi, Los Angeles, CA (US); Roberto Marchesini, Santa Monica, CA (US); Qianjiang (Bob) Mao, Chino Hills, CA (US); John Wallner, Calabasas, CA (US); John Richardson, Newbury Park, CA (US); Laurent Blanquart, Westlake Village, CA (US); Joey Shah, Thousand Oaks, CA (US)

(73) Assignee: AltaSens, Inc., Westlake Village, CA (US)

(*) Notice: Subject to any disclaimer, the term of this patent is extended or adjusted under 35 U.S.C. 154(b) by 504 days.

(21) Appl. No.: 11/715,808

(22) Filed: Mar. 7, 2007

(65) Prior Publication Data

US 2008/0218615 A1    Sep. 11, 2008

(51) Int. Cl.
*H04N 5/335*      (2006.01)
*H04N 5/217*      (2006.01)

(52) U.S. Cl. .................. 348/294; 348/241
(58) Field of Classification Search .......... 348/294
See application file for complete search history.

(56) References Cited

U.S. PATENT DOCUMENTS

| | | | |
|---|---|---|---|
| 5,172,249 A | 12/1992 | Hashimoto | |
| 5,892,540 A | 4/1999 | Kozlowski et al. | |
| 6,037,577 A | 3/2000 | Tanaka et al. | |
| 6,697,663 B1 | 2/2004 | Lin | |
| 6,861,634 B2 | 3/2005 | Rossi | |
| 7,420,602 B2* | 9/2008 | Fraenkel et al. | 348/294 |
| 7,508,422 B2* | 3/2009 | Kamon et al. | 348/229.1 |
| 2004/0212707 A1* | 10/2004 | Itoh et al. | 348/294 |
| 2005/0068436 A1* | 3/2005 | Fraenkel et al. | 348/294 |
| 2005/0073597 A1 | 4/2005 | Rengakuji et al. | |
| 2006/0007507 A1 | 1/2006 | Inaba et al. | |
| 2006/0077270 A1* | 4/2006 | Yuki et al. | 348/294 |
| 2006/0114343 A1* | 6/2006 | Zhang et al. | 348/294 |
| 2006/0176382 A1* | 8/2006 | Kokubo et al. | 348/294 |
| 2006/0231734 A1 | 10/2006 | Shaw | |

OTHER PUBLICATIONS

International Search Report.

* cited by examiner

*Primary Examiner*—Lin Ye
*Assistant Examiner*—Amy Hsu
(74) *Attorney, Agent, or Firm*—Reed Smith LLP

(57) ABSTRACT

A black clamp stabilization circuit for an image sensor utilizes a mixed-signal SoC block comprising sub-blocks to dynamically and precisely adjust the black level based on comparison to a reference black level. The black level adjustments include a first level regulation using digital control of an analog signal in a feedback loop that includes a programmable gain amplifier and high-resolution A/D converter. By applying the black clamping in the analog domain, dynamic range is extended. Additional black level regulation is subsequently performed in the digital domain to differentially eliminate line noise and column noise generated within the imaging System-on-Chip. By providing information between the sub-blocks, the algorithms can converge more quickly. The technique enables multiple signal paths to separately handle individual colors and to increase imaging data throughput.

8 Claims, 23 Drawing Sheets

FIG. 5

| PIXEL ARRAY | Number of pixels | |
|---|---|---|
| | H | V |
| Guard Band | 24 | 10+4+10 |
| OB dummy 1 | 8 | 8 |
| OB | 64 | 32 |
| OB dummy 2 | 12 | 8 |
| Clear dummy | 12 | 8 |
| Camera alignment | 32 | 26 |
| Boundary process | 8 | 8 |
| Nominal Record area | 4096 | 3072 |
| Boundary process | 8 | 8 |
| Camera alignment | 32 | 26 |
| Clear dummy | 12 | 8 |
| OB dummy 2 | 12 | 8 |
| OB | 64 | 32 |
| OB dummy 1 | 8 | 8 |
| Guard Band | 24 | 10+4+10 |
| Addressable field | 4352 | 3252 |
| Total number of pixels | 4416 | 3300 |

2 test rows

Not addressable field 2 test rows

```
// Code: OB clamp assign  DATA_int = obthreshen & finestep & (((datain >(AVG + obthreshhigh)) |
     (datain <(AVG - obthreshlow))) ? AVG : datain;

assign coarsedac =(obclamp_reset) ? coarsedacrst : dacinput ? (even_row ? coarsedacin_e : coarsedacin_o) : (even_row ?
coarsedaceven : coarsedacodd);
  assign finedac  = dacinput ? (even_row ? finedacin_e : finedacin_o) : (even_row ? finedaceven : finedacodd);

always @(avepix or blackref or blackrefhlsb ) begin
    case (avepix)
      0: INTBLACKREF = { blackref , blackrefhlsb } << 2 ;
      1: INTBLACKREF = { blackref , blackrefhlsb } << 3 ;
      2: INTBLACKREF = { blackref , blackrefhlsb } << 4 ;
      3: INTBLACKREF = { blackref , blackrefhlsb } << 5 ;
      4: INTBLACKREF = { blackref , blackrefhlsb } ; // 2 pixel average
      default : INTBLACKREF = { blackref , blackrefhlsb } << 2 ;
    endcase
  end always @(avepix or strongpush_limit ) begin
    case (avepix)
      0: STRONGREF = 8 <<  strongpush_limit;
      1: STRONGREF = 16 << strongpush_limit;
      2: STRONGREF = 32 << strongpush_limit ;
      3: STRONGREF = 64 << strongpush_limit ;
      4: STRONGREF = 2 << strongpush_limit ; // 2 pixel average
      default: STRONGREF = 8 <<  strongpush_limit;
    endcase
  end `define     BLACKIDLE       2'b00
  `define     BLACKADD        2'b01
  `define     BLACKEVAL       2'b10
  `define     BLACKWAIT       2'b11 always @(posedge clk or negedge blackresetb) begin
    if (~blackresetb) begin
      BLACKSTATE <= `BLACKIDLE;
      ACCU <= 0;
      STRONGPUSH_REG <= 0;
      STEPPUSH_REG <= 0;
      PUSHDOWN_REG <= 0;
      PUSHUP_REG <= 0;
      BLACKCOUNTER <= 0;

AVG <= 128;
      finestep <= 0;
    end
```

FIG. 13A

```
    else case (BLACKSTATE)
`BLACKIDLE: begin
        STRONGPUSH_REG <= 0;
        STEPPUSH_REG <= 0;
        PUSHDOWN_REG <= 0;
        PUSHUP_REG <= 0;
        if (BLACKCOUNTER != 0) BLACKCOUNTER <= BLACKCOUNTER - 1;
        else if (
                (rowblack & pixelactive)
                || (column_clamp_en && pixelblack )
        )
    begin
      ACCU <= 0;
      case (avepix)
        0: BLACKCOUNTER <= 7;
        1: BLACKCOUNTER <= 15;
        2: BLACKCOUNTER <= 31;
        3: BLACKCOUNTER <= 63;
        4: BLACKCOUNTER <= 1; // 2 pixel average
        default : BLACKCOUNTER <= 7;
      endcase
      BLACKSTATE <= `BLACKADD;
    end
  end `BLACKADD: begin
        ACCU <= ACCU + DATA_int;
      if (BLACKCOUNTER == 'b0 || pixelactive=='b0) BLACKSTATE <= (pixelactive?`BLACKEVAL: `BLACKIDLE); //
pixelactive check added 4/10/06 JDW JS
      else BLACKCOUNTER <= BLACKCOUNTER - 1;
  end `BLACKEVAL: begin
    finestep <= 1;
    case (avepix)
      0: AVG <= ACCU[14:3];
      1: AVG <= ACCU[15:4];
      2: AVG <= ACCU[16:5];
      3: AVG <= ACCU[17:6];
      4: AVG <= ACCU[12:1]; // 2 pixel average
      default : AVG <= blackref;
    endcase
    if (ACCU == INTBLACKREF) begin
      BLACKSTATE <= `BLACKIDLE;
    end
                    else if (ACCU < INTBLACKREF) begin
      if ((INTBLACKREF - ACCU) > STRONGREF & strongpush_en ) begin
        STRONGPUSH_REG <= 1; finestep <= 0;
      end
      if ((INTBLACKREF - ACCU) > (STRONGREF>>3) & steppush ) STEPPUSH_REG <= 1;
      PUSHUP_REG <= 1;
      PUSHDOWN_REG <= 0;
      BLACKSTATE <= `BLACKWAIT;
    end
```

FIG. 13B

```
                    else begin
        if ((ACCU - INTBLACKREF ) > STRONGREF & strongpush_en ) begin
           STRONGPUSH_REG <= 1; finestep <= 0;
        end
        if ((ACCU - INTBLACKREF ) > (STRONGREF>>3) & steppush ) STEPPUSH_REG <= 1;
        PUSHUP_REG <= 0;
        PUSHDOWN_REG <= 1;
        BLACKSTATE <= `BLACKWAIT;
      end
    end `BLACKWAIT: begin
     if (ENABLEREG2) begin
      if (!STRONGPUSH_REG | !noblackwait) begin
                            BLACKCOUNTER <= blackwaittime ; BLACKSTATE <= `BLACKIDLE;
                            STRONGPUSH_REG <= 0;
                        STEPPUSH_REG <= 0;
                        PUSHDOWN_REG <= 0;
                        PUSHUP_REG <= 0;
                         end
                       end
                  end
         endcase
end // always wire STRONGPUSH_MUXOUT = STRONGPUSH_REG;
wire PUSHUP_MUXOUT = PUSHUP_REG;
wire PUSHDOWN_MUXOUT = PUSHDOWN_REG;

always @(posedge clk or negedge blackresetb) begin
         if (~blackresetb) begin
                ENABLEREG <= 0;
                ENABLEREG2 <= 0;

end
else begin
                if (ENABLEREG2) begin
                        ENABLEREG <= 0;
      ENABLEREG2 <= 0;
    end
    else if (STRONGPUSH_MUXOUT & !ENABLEREG) begin
                        ENABLEREG <= 1;
    end
                else if (PUSHUP_MUXOUT | PUSHDOWN_MUXOUT) begin
                        ENABLEREG2 <= 1;
    end
         end
end wire    STRONGPUSH = STRONGPUSH_MUXOUT & ENABLEREG2;
wire    PUSHDOWN   = PUSHDOWN_MUXOUT & ENABLEREG2;
wire    PUSHUP     = PUSHUP_MUXOUT & ENABLEREG2;
wire    STEPPUSH;
```

FIG. 13C

```verilog
assign STEPPUSH   = STEPPUSH_REG & ENABLEREG2;

reg [11:0] difffast;

always @(fastthresh or AVG or blackref or ob_faststep_divide) begin
        if ((AVG > blackref) & ((AVG - blackref) >= fastthresh ))
                difffast <= (AVG - blackref) >> ob_faststep_divide ;
        else if ((blackref > AVG) & ((blackref - AVG) >= fastthresh ))
                difffast <= (blackref - AVG) >> ob_faststep_divide ;
        else
                difffast <= 0;
end wire [8:0] finedacodd_tempa8;
  assign finedacodd_tempa8 = finedacodd + 8;
wire [8:0] coarsedacodd_tempa4 = coarsedacodd + 4;
wire [12:0] coarseadddiffodd = coarsedacodd + difffast[11:3];
wire [11:0] coarsesubdiffodd = (coarsedacodd > difffast[11:3]) ? (coarsedacodd - difffast[11:3]) : 12'b0
always @(posedge clk or negedge readresetb) begin
        if (~readresetb) begin
    // coarsedacodd <= coarsedacrst;
    // finedacodd <= finedacin_o;
      coarsedacodd <= 0;
      finedacodd <= 'b0;
        end
        else if (~even_row) begin
                if (PUSHDOWN) begin
                        if (faststep & (difffast != 0)) begin
                                if (coarseadddiffodd >= 255) coarsedacodd <= 255;
                                else coarsedacodd <= coarseadddiffodd[11:0];
                        end
                        else if (STRONGPUSH) begin
                                if (coarsedacodd != 8'hff)   coarsedacodd <= coarsedacodd + 1;
                        end
                        else if (STEPPUSH) begin
                                if (finedacodd_tempa8[8]) begin
                                        if (coarsedacodd_tempa4 >= 8'hff) coarsedacodd <= 8'hff;
                                        else coarsedacodd <= coarsedacodd_tempa4[7:0];
                        end
                                finedacodd <= finedacodd_tempa8[7:0];
                        end
                        else if (finedacodd == 8'hff) begin
                                finedacodd <= 8'h00;
                                if (coarsedacodd_tempa4 >= 8'hff) coarsedacodd <= 8'hff;
                                else coarsedacodd <= coarsedacodd_tempa4[7:0];
                        end
                        else finedacodd <= finedacodd + 1;
                end
                else if (PUSHUP) begin
                        if (faststep & (difffast != 0)) coarsedacodd <= coarsesubdiffodd;
                        else if (STRONGPUSH) begin
                                if (coarsedacodd != 8'h00) coarsedacodd <= coarsedacodd - 1;
                                else begin
                                        if (finedacodd < 8'h07) finedacodd <= 8'h00;
                                        else finedacodd <= finedacodd - 8;
```

FIG. 13D

```verilog
                                        end
                                end
                        else if (STEPPUSH) begin
                                if (finedacodd < 8'h07) begin
                                        if (coarsedacodd != 8'h00) begin
                                                coarsedacodd <= coarsedacodd - 1;
                                                finedacodd <= 8'h40 - finedacodd;
                                        end
                                        else finedacodd <= 8'h00;
                                end
                                else finedacodd <= finedacodd - 8;
                        end
                        else if (finedacodd == 8'h00) begin
                                if (coarsedacodd != 8'h00) begin
                                        coarsedacodd <= coarsedacodd - 1;
                                        finedacodd <= 8'h40 - 1;
                                end
                        end
                        else finedacodd <= finedacodd - 1;
                        end // if PUSHUP
                end // if (~even_row)
end // always wire [8:0] finedaceven_tempa8 = finedaceven + 8;
wire [8:0] coarsedaceven_tempa4 = coarsedaceven + 4;
wire [12:0] coarseadddiffeven = coarsedaceven + difffast[11:3]; // was 11:4 jdw jr
wire [11:0] coarsesubdiffeven = (coarsedaceven > difffast[11:3]) ? (coarsedaceven - difffast[11:3]) : 12'b0;
always @(posedge clk or negedge readresetb) begin
                if (~readresetb) begin
        //      coarsedaceven <= coarsedacrst;
        //      finedaceven <= finedacin_e;
                coarsedaceven <= 'b0;
                finedaceven <= 'b0;
        end
                else if (even_row) begin
                        if (PUSHDOWN) begin
                                if (faststep & (difffast != 0)) begin if (coarseadddiffeven >= 255) coarsedaceven <= 255;
                                        else coarsedaceven <= coarseadddiffeven[11:0];

end else if (STRONGPUSH) begin if (coarsedaceven != 8'hff) coarsedaceven <= coarsedaceven + 1;

end else if (STEPPUSH) begin if (finedaceven_tempa8[8]) begin
                                        if (coarsedaceven_tempa4 >= 8'hff) coarsedaceven <= 8'hff;
                                        else coarsedaceven <= coarsedaceven_tempa4[7:0];
                                end
                                        finedaceven <= finedaceven_tempa8[7:0];

end else if (finedaceven == 8'hff) begin
```

FIG. 13E

```
                finedaceven <= 8'h00;
                if (coarsedaceven_tempa4 >= 8'hff) coarsedaceven <= 8'hff;
                else coarsedaceven <= coarsedaceven_tempa4[7:0];

end else finedaceven <= finedaceven + 1;

end else if (PUSHUP) begin if (faststep & (difffast != 0)) coarsedaceven <= coarsesubdiffeven;

else if (STRONGPUSH) begin
                if (coarsedaceven != 8'h00) coarsedaceven <= coarsedaceven - 1;
                else begin
                        if (finedaceven < 8'h07) finedaceven <= 8'h00;
                        else finedaceven <= finedaceven - 8;
                end end else if (STEPPUSH) begin if (finedaceven < 8'h07) begin
                        if (coarsedaceven != 8'h00) begin
                                coarsedaceven <= coarsedaceven - 1;
                                finedaceven <= 8'h40 - finedaceven;
                        end else finedaceven <= 8'h00;
                end else finedaceven <= finedaceven - 8;

end else if (finedaceven == 8'h00) begin
                if (coarsedaceven != 8'h00) begin
                        coarsedaceven <= coarsedaceven - 1;
                        finedaceven <= 8'h40 - 1;
                end
        end else finedaceven <= finedaceven - 1;
        end // if (PUSHUP)
    end // if (even_row)
end // always
```

FIG. 13F

Programming Registers for Line Noise Suppression

| Register Name | No. bits | Register Address | Description |
|---|---|---|---|
| LineBlackRef | 12-bits [11:0] | x53 [7:0] = LineBlackRef[7:0]<br><br>x54 [3:0] = LineBlackRef[11:8] | Unsigned 12-bits register, with range from 0 – 4095; it sets the black reference with which the line average is compared to |
| LineBlackRef_LSB | 1-bit | x52 [4] | It sets the decimal bit for register *LineBlackRef*; if set to 1, it is equivalent to adding 0.5 LSB to *LineBlackRef*, then $LineOffset_R = round(LineBlackRef - LineAve_R)$ if set to 0, then $LineOffset_R = floor(LineBlackRef - LineAve_R)$ |
| LineNoise_evalAve_en | 1-bit | x52 [0] | Enable line average calculation. If it is 0, both *LineAve* and *LineOffset* are 0. |
| LineNoise_evalOffset_en | 1-bit | x52 [3] | Enable line offset subtraction. Note, *LineNoise_evalAve_en* must also be 1 to enable *LineOffset* calculation. |
| LineNoiseMode | 2-bits [1:0] | x52 [2:1] | 1- pixel data from each ADC chain are independently accumulated and averaged,<br>2- pixel data from 2 top ADCs are accumulated together and averaged, and pixel data from 2 bottom ADCs are accumulated and averaged, the top and bottom chains are independent,<br>3 or 0- pixels data from all 4 ADCs are accumulated together and averaged as a whole |
| STARTADDR_DARK | 3-bits [2:0] | x10 [2:0] | Selects the horizontal window start for black pixels. Each address corresponds to a block of 32 black pixels (8 per ADC chain). |
| STOPADDR_DARK | 3-bits [2:0] | x10 [5:3] | Selects the horizontal window stop for black pixels. Each address corresponds to a block of 32 black pixels (8 per ADC chain). The total number of black pixels scanned is (STOPADDR_DARK-STARTADDR_DARK)*32. |

FIG. 14

| *LineNoiseMode = 1* | | |
|---|---|---|
| NumPixelBlack | Sum | Line Average |
| 0 | $sum_{T1} = \sum_{i=1}^{8} P_{T1i}$ $sum_{T2} = \sum_{i=1}^{8} P_{T2i}$ $sum_{B1} = \sum_{i=1}^{8} P_{B1i}$ $sum_{B2} = \sum_{i=1}^{8} P_{B2i}$ | $LineAve_{T1} = \dfrac{sum_{T1}}{8}$ $LineAve_{T2} = \dfrac{sum_{T2}}{8}$ $LineAve_{B1} = \dfrac{sum_{B1}}{8}$ $LineAve_{B2} = \dfrac{sum_{B2}}{8}$ |
| 1 | $sum_{T1} = \sum_{i=1}^{16} P_{T1i}$ $sum_{T2} = \sum_{i=1}^{16} P_{T2i}$ $sum_{B1} = \sum_{i=1}^{16} P_{B1i}$ $sum_{B2} = \sum_{i=1}^{16} P_{B2i}$ | $LineAve_{T1} = \dfrac{sum_{T1}}{16}$ $LineAve_{T2} = \dfrac{sum_{T2}}{16}$ $LineAve_{B1} = \dfrac{sum_{B1}}{16}$ $LineAve_{B2} = \dfrac{sum_{B2}}{16}$ |
| 2 | $sum_{T1} = \sum_{i=1}^{24} P_{T1i}$ $sum_{T2} = \sum_{i=1}^{24} P_{T2i}$ $sum_{B1} = \sum_{i=1}^{24} P_{B1i}$ $sum_{B2} = \sum_{i=1}^{24} P_{B2i}$ | $x_{T1} = \sum_{i=1}^{24} P_{T1i}, x_{T2} = \sum_{i=1}^{24} P_{T2i}, x_{B1} = \sum_{i=1}^{24} P_{B1i}, x_{B2} = \sum_{i=1}^{24} P_{B2i}$ $LineAve_{T1} = \dfrac{32x_T + 8x_T + 2x_T + x_T}{1024} \cong \dfrac{x_T}{23.8}$ $LineAve_{T2} = \dfrac{32x_T + 8x_T + 2x_T + x_T}{1024} \cong \dfrac{x_T}{23.8}$ $LineAve_{B1} = \dfrac{32x_B + 8x_B + 2x_B + x_B}{1024} \cong \dfrac{x_B}{23.8}$ $LineAve_{B2} = \dfrac{32x_B + 8x_B + 2x_B + x_B}{1024} \cong \dfrac{x_B}{23.8}$ |
| 3 and up | $sum_{T1} = \sum_{i=1}^{32} P_{T1i}$ $sum_{T2} = \sum_{i=1}^{32} P_{T2i}$ $sum_{B1} = \sum_{i=1}^{32} P_{B1i}$ $sum_{B2} = \sum_{i=1}^{32} P_{B2i}$ | $LineAve_{T1} = \dfrac{sum_{T1}}{32}$ $LineAve_{T2} = \dfrac{sum_{T2}}{32}$ $LineAve_{B1} = \dfrac{sum_{B1}}{32}$ $LineAve_{B2} = \dfrac{sum_{B2}}{32}$ |

FIG. 15A

| LineNoiseMode = 2 | | |
|---|---|---|
| NumPixelBlack | Sum | Line Average |
| 0 | $sum_{TOP} = sum_{T1} + sum_{T2} = \sum_{i=1}^{8} P_{T1i} + \sum_{i=1}^{8} P_{T2i}$<br>$sum_{BOT} = sum_{B1} + sum_{B2} = \sum_{i=1}^{8} P_{B1i} + \sum_{i=1}^{8} P_{B2i}$ | $LineAve_{T1} = \dfrac{sum_{TOP}}{16}$<br>$LineAve_{T2} = \dfrac{sum_{TOP}}{16}$<br>$LineAve_{B1} = \dfrac{sum_{BOT}}{16}$<br>$LineAve_{B2} = \dfrac{sum_{BOT}}{16}$ |
| 1 | $sum_{TOP} = sum_{T1} + sum_{T2} = \sum_{i=1}^{16} P_{T1i} + \sum_{i=1}^{16} P_{T2i}$<br>$sum_{BOT} = sum_{B1} + sum_{B2} = \sum_{i=1}^{16} P_{B1i} + \sum_{i=1}^{16} P_{B2i}$ | $LineAve_{T1} = \dfrac{sum_{TOP}}{32}$<br>$LineAve_{T2} = \dfrac{sum_{TOP}}{32}$<br>$LineAve_{B1} = \dfrac{sum_{BOT}}{32}$<br>$LineAve_{B2} = \dfrac{sum_{BOT}}{32}$ |
| 2 | $sum_{TOP} = sum_{T1} + sum_{T2} = \sum_{i=1}^{24} P_{T1i} + \sum_{i=1}^{24} P_{T2i}$<br>$sum_{BOT} = sum_{B1} + sum_{B2} = \sum_{i=1}^{24} P_{B1i} + \sum_{i=1}^{24} P_{B2i}$ | $x_T = sum_{TOP}, x_B = sum_{BOT}$<br>$LineAve_{T1} = \dfrac{32x_T + 8x_T + 2x_T + x_T}{2048} \cong \dfrac{x_T}{47.6}$<br>$LineAve_{T2} = \dfrac{32x_T + 8x_T + 2x_T + x_T}{2048} \cong \dfrac{x_T}{47.6}$<br>$LineAve_{B1} = \dfrac{32x_B + 8x_B + 2x_B + x_B}{2048} \cong \dfrac{x_B}{47.6}$<br>$LineAve_{B2} = \dfrac{32x_B + 8x_B + 2x_B + x_B}{2048} \cong \dfrac{x_B}{47.6}$ |
| 3 and up | $sum_{TOP} = sum_{T1} + sum_{T2} = \sum_{i=1}^{32} P_{T1i} + \sum_{i=1}^{32} P_{T2i}$<br>$sum_{BOT} = sum_{B1} + sum_{B2} = \sum_{i=1}^{32} P_{B1i} + \sum_{i=1}^{32} P_{B2i}$ | $LineAve_{T1} = \dfrac{sum_{TOP}}{64}$<br>$LineAve_{T2} = \dfrac{sum_{TOP}}{64}$<br>$LineAve_{B1} = \dfrac{sum_{BOT}}{64}$<br>$LineAve_{B2} = \dfrac{sum_{BOT}}{64}$ |

FIG. 15B

| LineNoiseMode = 3 or 0 | | |
|---|---|---|
| NumPixelBlack | Sum | Line Average |
| 0 | $sum_{ALL} = sum_{T1} + sum_{T2} + sum_{B1} + sum_{B2}$ $= \sum_{i=1}^{8} P_{T1i} + \sum_{i=1}^{8} P_{T2i} + \sum_{i=1}^{8} P_{B1i} + \sum_{i=1}^{8} P_{B2i}$ | $LineAve_{T1} = \frac{sum_{ALL}}{32}$ $LineAve_{T2} = \frac{sum_{ALL}}{32}$ $LineAve_{B1} = \frac{sum_{ALL}}{32}$ $LineAve_{B2} = \frac{sum_{ALL}}{32}$ |
| 1 | $sum_{ALL} = sum_{T1} + sum_{T2} + sum_{B1} + sum_{B2}$ $= \sum_{i=1}^{16} P_{T1i} + \sum_{i=1}^{16} P_{T2i} + \sum_{i=1}^{16} P_{B1i} + \sum_{i=1}^{16} P_{B2i}$ | $LineAve_{T1} = \frac{sum_{ALL}}{64}$ $LineAve_{T2} = \frac{sum_{ALL}}{64}$ $LineAve_{B1} = \frac{sum_{ALL}}{64}$ $LineAve_{B2} = \frac{sum_{ALL}}{64}$ |
| 2 | $sum_{ALL} = sum_{T1} + sum_{T2} + sum_{B1} + sum_{B2}$ $= \sum_{i=1}^{24} P_{T1i} + \sum_{i=1}^{24} P_{T2i} + \sum_{i=1}^{24} P_{B1i} + \sum_{i=1}^{24} P_{B2i}$ | $x = sum_{ALL}$ $LineAve_{T1} = \frac{32x + 8x + 2x + x}{4096} \cong \frac{x}{95.3}$ $LineAve_{T2} = \frac{32x + 8x + 2x + x}{4096} \cong \frac{x}{95.3}$ $LineAve_{B1} = \frac{32x + 8x + 2x + x}{4096} \cong \frac{x}{95.3}$ $LineAve_{B2} = \frac{32x + 8x + 2x + x}{4096} \cong \frac{x}{95.3}$ |
| 3 and up | $sum_{ALL} = sum_{T1} + sum_{T2} + sum_{B1} + sum_{B2}$ $= \sum_{i=1}^{32} P_{T1i} + \sum_{i=1}^{32} P_{T2i} + \sum_{i=1}^{32} P_{B1i} + \sum_{i=1}^{32} P_{B2i}$ | $LineAve_{T1} = \frac{sum_{ALL}}{128}$ $LineAve_{T2} = \frac{sum_{ALL}}{128}$ $LineAve_{B1} = \frac{sum_{ALL}}{128}$ $LineAve_{B2} = \frac{sum_{ALL}}{128}$ |

FIG. 15C

APPARATUS AND METHOD FOR STABILIZING IMAGE SENSOR BLACK LEVEL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The present invention is related to: U.S. patent application Ser. No. 11/715,798, entitled, "CROSS-COUPLED DIFFERENTIAL DAC-BASED CLAMP CIRCUIT," filed Mar. 7, 2007, the disclosure of which is herein incorporated by reference.

BACKGROUND OF THE INVENTION

1. Field of the Invention

The present invention relates generally to electronic imaging sensors and, specifically, to advanced imaging system-on-chip (iSoC) sensors having embedded signal processing functions.

2. Description of the Related Art

Imaging sensors operate by collecting light intensity in a contiguous array of imaging pixels. Each pixel will have a charge proportional to the intensity of the light incident on the pixel over the duration of exposure. This charge is a "pixel value" that must be read out with as little noise as possible to capture a high quality image or generate video. Although modern CMOS sensors have lower temporal noise than CCD imaging sensors at data rate >25 MHz, several sources of systematic artifacts can degrade image quality, especially at low illumination.

Readout of the image electronically reproduced in CMOS imaging sensors is achieved by routing the signal from each row of pixels through a set of column buffers to the output as shown in FIG. 1 from U.S. Pat. No. 6,861,634. Each column buffer 102 normally supports a specific column of pixels and is constructed using an integrated amplifier block such as taught in U.S. Pat. No. 5,892,540. Although circuit block 70 in FIG. 2 from '540 corrects column buffer offsets in the analog domain to about 100 μV rms as compared to a full-scale signal on the order of 1V, i.e., one part in $10^4$, maximizing image quality mandates further reducing "column noise." Likewise, because each video line is read at a different time than either the prior or next line, the readout process can introduce "line noise." Furthermore, the supporting column buffers use common reference voltages (such as REF1, REF2 and REF3 in FIG. 2) that carry intrinsic noise with time-varying characteristics. Since each row of pixels is sampled at the same time, each row of pixels samples the common reference noise at similar aggregate value. On the other hand, subsequent rows are interrogated at different times and thus sample the common references at slightly different collective values. This row-to-row variability generates "line noise" and frame-to-frame "flicker." All these possible noise mechanisms degrade image quality via the following deleterious effects:

1. Vertical stripes that are set and can dynamically fluctuate on a column-to-column basis.
2. Horizontal stripes that are set and can dynamically fluctuate on a line-to-line basis, i.e., line noise wherein each line is a horizontal stripe of pixels.
3. Frame-to-frame instability that is a by-product of an image sensor's sensitivity to reference noise. The sensitivity effectively destabilizes the sensor's black level on a frame-by-frame basis since vertical blanking time is significantly longer than horizontal blanking time. Hence, black reference behavior is strongly frame-dependent.

In high performance imaging sensors, the most distracting effect is frame-to-frame instability.

In the prior art, U.S. Pat. No. 5,172,249 subtracts amplifier offsets and FPN by applying signal and reference levels to the input of a subtraction circuit, such as a differential amplifier, without due consideration for the deleterious impact of wide-band noise in causing offset correction errors. U.S. Pat. No. 6,037,577 alternatively provides means to suppress row noise on a row-by-row basis. However, the primary intent is again to suppress offsets from switching noise and charge redistribution among the parallel signal paths rather than to eliminate discretely sampled common reference noise.

U.S. Pat. No. 6,861,634 subsequently teaches a technique for subtracting reference noise in addition to other sources of sensor noise. The noise subtraction is performed in the analog domain using a correction value previously determined in the digital domain. The analog value is supplied to a sample-and-hold circuit including a charge amplifier for subtracting the offset. The preferred embodiment teaches pseudo-differential or differential signal paths using the pixel's signal level and associated reset level. Unfortunately, burdening the signal path by also supplying the reset level to the offset-subtracting amplifier halves the maximum video rate, doubles the concomitant video bandwidth, and boosts white noise. The correction is also carried out at high speed on a pixel-by-pixel and per-color basis, thus increasing complexity and signal processing overhead.

Recently, U.S. Patent Application Publication No. 2006/0231734 teaches wholly digital means to determine and correct column fixed pattern noise. This effectively limits accuracy of the various corrections rather than enhancing the analog dynamic range presented for A/D conversion.

SUMMARY OF THE INVENTION

The present invention includes a method, circuit implementation and firmware code that together provide superior black level stabilization. Analog circuits, digital circuits, and algorithms jointly suppress the various fixed pattern noise sources inherent in "reading out" arrays of image-sensing pixels, while simultaneously maximizing the dynamic range in the analog domain. In a preferred embodiment, the noise suppression is performed in the digital domain using algorithms specifically optimized to produce electronic images with useful image quality spanning at least 16 bits of dynamic range, even though only 12 bits may be supplied to the camera from frame-to-frame.

In one embodiment, the present invention comprises an apparatus for processing a signal output from a pixel array, the pixel array having optical black pixels and active clear pixels, the apparatus comprising a black clamp block, wherein the black clamp block receives an output signal from the pixel array, compares a black level from the output signal to a black reference value, and outputs an adjustment signal based on the comparison to adjust a black level in the output signal;

a line noise correction block, wherein the line noise correction block receives the output signal adjusted by the black clamp block, calculates a line noise average value for black pixels in the output signal on a line-by-line basis, calculates a line noise offset based on a difference between the line noise average and the black reference value, and applies the line noise offset to clear pixels in the output signal; and a column noise correction block, wherein the column noise correction block calculates a column noise offset for black pixels in the output signal, and applies the column noise offset to the clear pixels in the output signal;

wherein the column noise offset is calculated on a column basis by comparing the output signal for each black pixel with the line noise average value calculated by the line noise correction block.

The apparatus may further comprise a column noise correction memory, the memory storing column noise offset coefficients, wherein the column noise offset coefficients are updated using a differential technique, such that coefficients stored in the memory represent a difference of column noise relative to line noise.

Another embodiment of the present invention comprises a signal processing circuit for processing an output signal from a pixel array, the pixel array having optical black pixels and active clear pixels, the circuit comprising a differential programmable gain amplifier, one input of the differential programmable gain amplifier connected to the output signal from the pixel array;

an analog-to-digital converter connected to the differential programmable gain amplifier, wherein the analog-to-digital converter converts an output signal from the programmable gain amplifier into a digitized output signal;

a black clamp processing block connected to the analog-to-digital converter, wherein the black clamp processing block compares the digitized output signal with a black reference value, and outputs a black level adjustment signal to an input of the programmable gain amplifier;

a line noise correction processing block connected to the analog-to-digital converter, wherein the line noise correction processing block calculates a line noise average value for black pixels in the output signal on a line-by-line basis, and calculates a line noise offset based on a difference between the line noise average value and the black reference value;

a column noise correction processing block, wherein the column noise correction processing block calculates a column noise offset for black pixels in the digitized output signal, the column noise offset calculated on a column basis by comparing the digitized output signal for each black pixel with the line noise average value calculated by the line noise correction processing block;

a first adder to add the column noise offset to the clear pixels in the digitized output signal; and a second adder to add the line noise offset to the clear pixels in the digitized output signal.

The circuit of the present invention may further comprise a column noise correction memory, the memory storing column noise offset coefficients, wherein column noise offset coefficients are updated using a differential technique, such that coefficients stored in the memory represent a difference of column noise relative to line noise.

According to one embodiment, a method of the present invention includes a method to process an output signal from a pixel array, the pixel array having optical black pixels and active clear pixels, the method comprising:

calculating a black level adjustment signal, wherein calculating the black level adjustment signal comprises:

comparing an output signal from the pixel array with a black reference value;

calculating a line noise correction value, wherein calculating the line noise correction value comprises:

calculating a line noise average value; and comparing the line noise average value to the black reference value;

calculating a column noise correction value; wherein calculating the column noise correction value comprises:

comparing the digitized output signal for each black pixel with the line noise average value calculated by the line noise correction processing block;

adjusting a black level in the output signal according to the black level adjustment signal to form a second output signal;

adding the column noise correction value to the second output signal to form a third output signal; and adding the line noise correction value to the third output signal. The method may further includes storing column noise offset coefficients in a memory and updating them using a differential technique, such that the coefficients stored in the memory represent a difference of column noise relative to line noise.

BRIEF DESCRIPTION OF THE DRAWINGS

The present invention will be readily understood by the following detailed description in conjunction with the accompanying drawings, wherein like reference numerals designate like structural elements, and in which:

FIG. 5 is a table articulating the structure of the sensor array partitioned in FIG. 3 and shown in schematic circuit form in FIG. 6;

FIG. 13A begins a listing of an implementation of the Verilog code for general black clamping in BlackClamp Block 500;

FIG. 13B continues the code of FIG. 13A;

FIG. 13C continues the code of FIG. 13B;

FIG. 13D continues the code of FIG. 13C;

FIG. 13E continues the code of FIG. 13D;

FIG. 13F completes the Verilog code for implementing BlackClamp Block 500 listed in FIGS. 13A through 13E;

FIG. 14 lists the programming registers pertaining to line noise suppression;

FIG. 15A is a table of the algorithms for LineNoiseMode=1;

FIG. 15B is a table of the algorithms for LineNoiseMode=2;

FIG. 15C is a table of the algorithms for LineNoiseMode=3 or 0; and

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1:
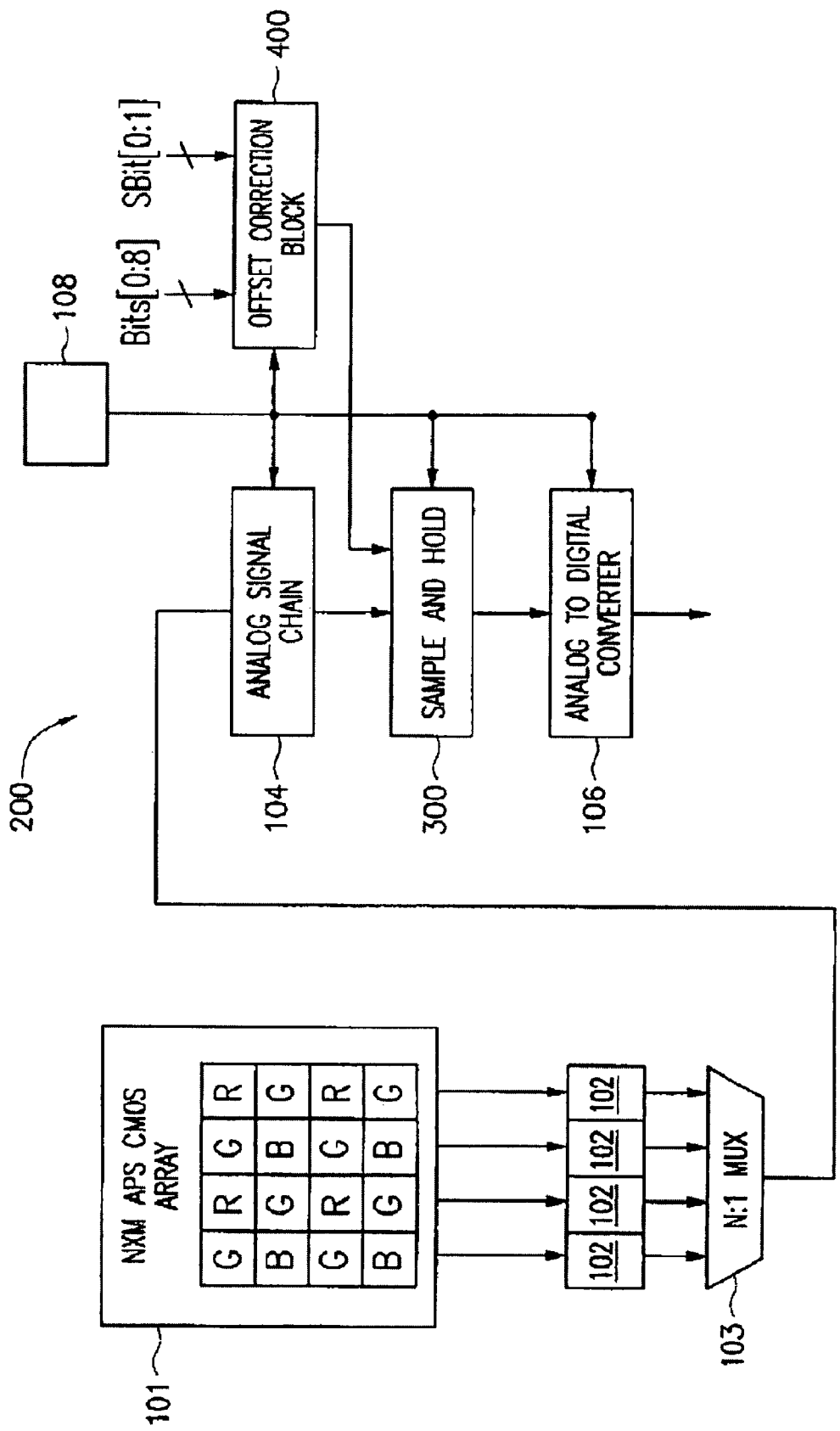
FIG. 1 is a block diagram of a prior art CMOS APS system with digital correction terms applied via analog circuits from U.S. Pat. No. 6,861,634.
Figure 2:
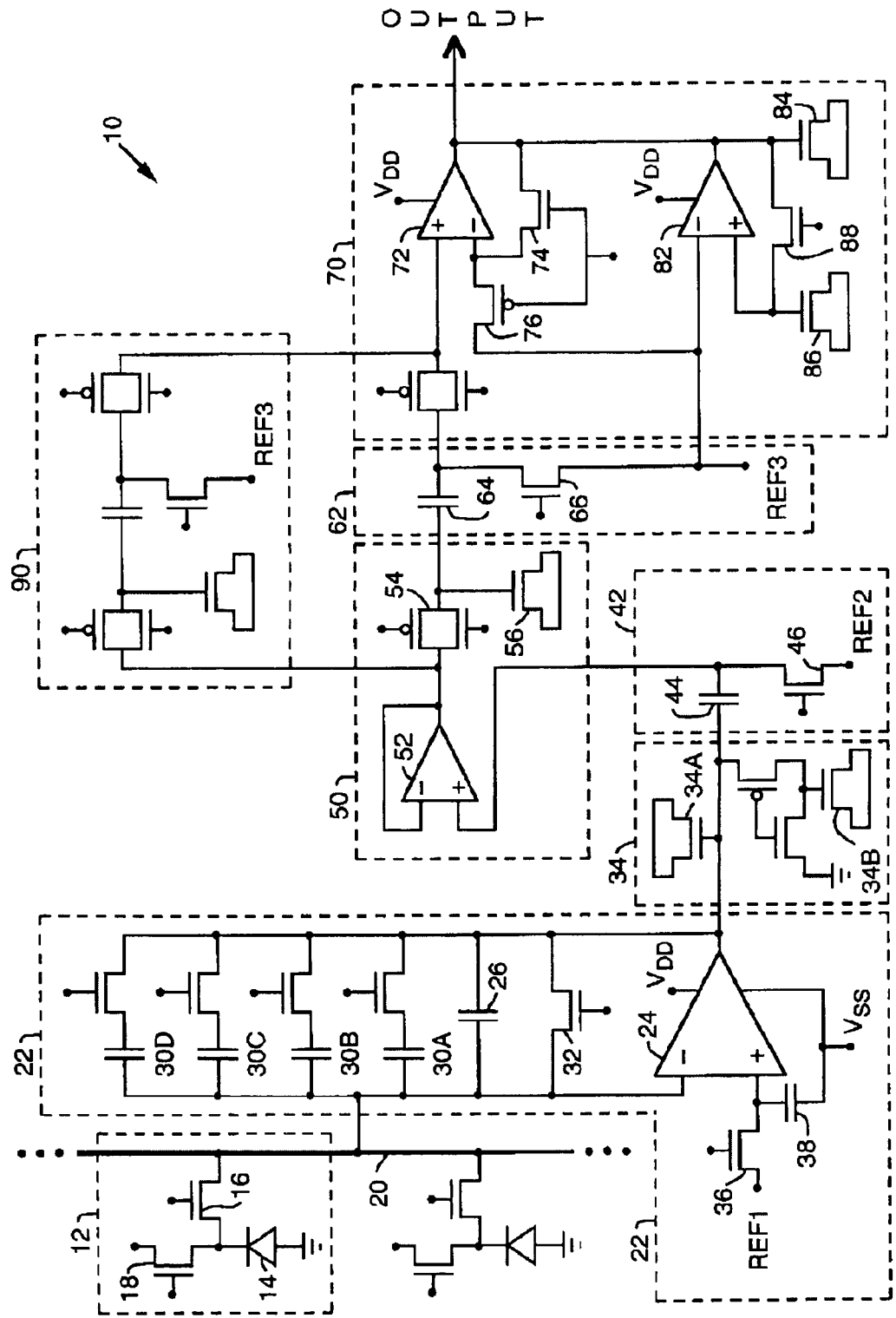
FIG. 2 is a schematic diagram of a prior art column buffer taught in U.S. Pat. No. 5,892,540.
Figure 3:
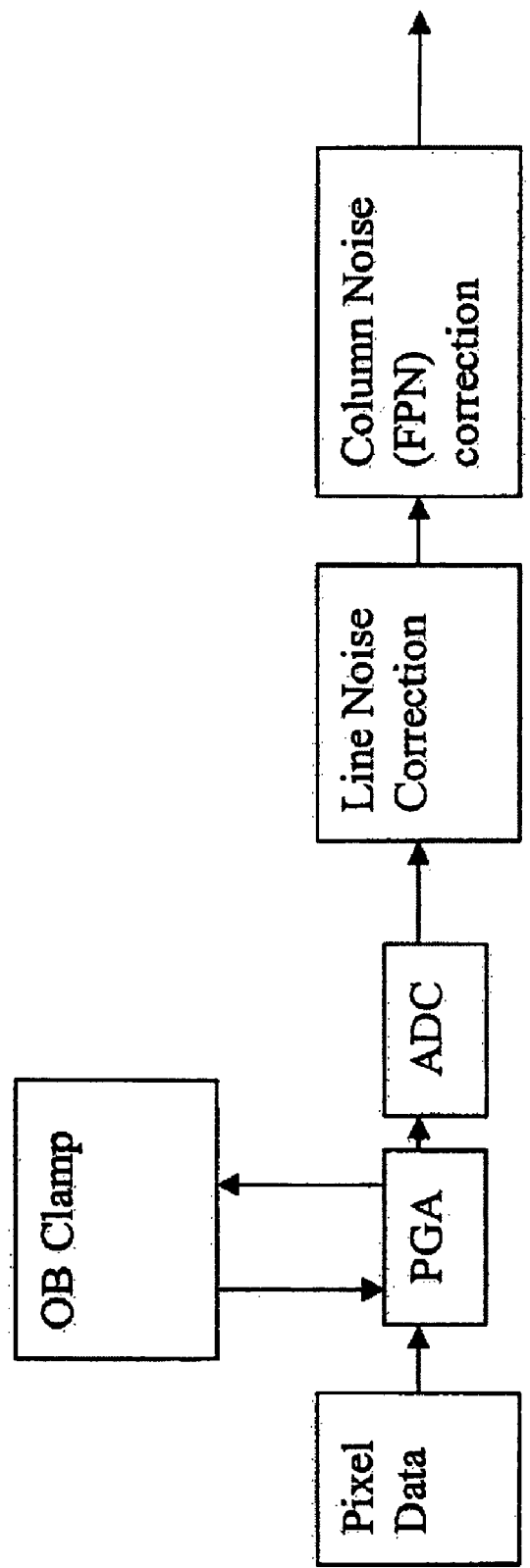
FIG. 3 is a block diagram of a prior art architecture for processing output from an image sensor.

In general, conventional image sensors consist of a pixel array that outputs an image signal, and digital imaging processing blocks that are designed to increase the quality of the resulting image. Currently, there are three general types of processing algorithms used: black clamping, line noise correction, and column fixed pattern noise (FPN) correction. Historically, these algorithms have been deployed in a separate and discrete fashion, with each algorithm operating independently of the others (see FIG. 3). The present invention, however, as described below, overcomes the limitations of the prior art, and provides an architecture that shares information between the processing blocks (algorithms). This provides several advantages including faster convergence of the digital algorithms, higher quality image output, and possibly smaller circuitry.

Figure 4:
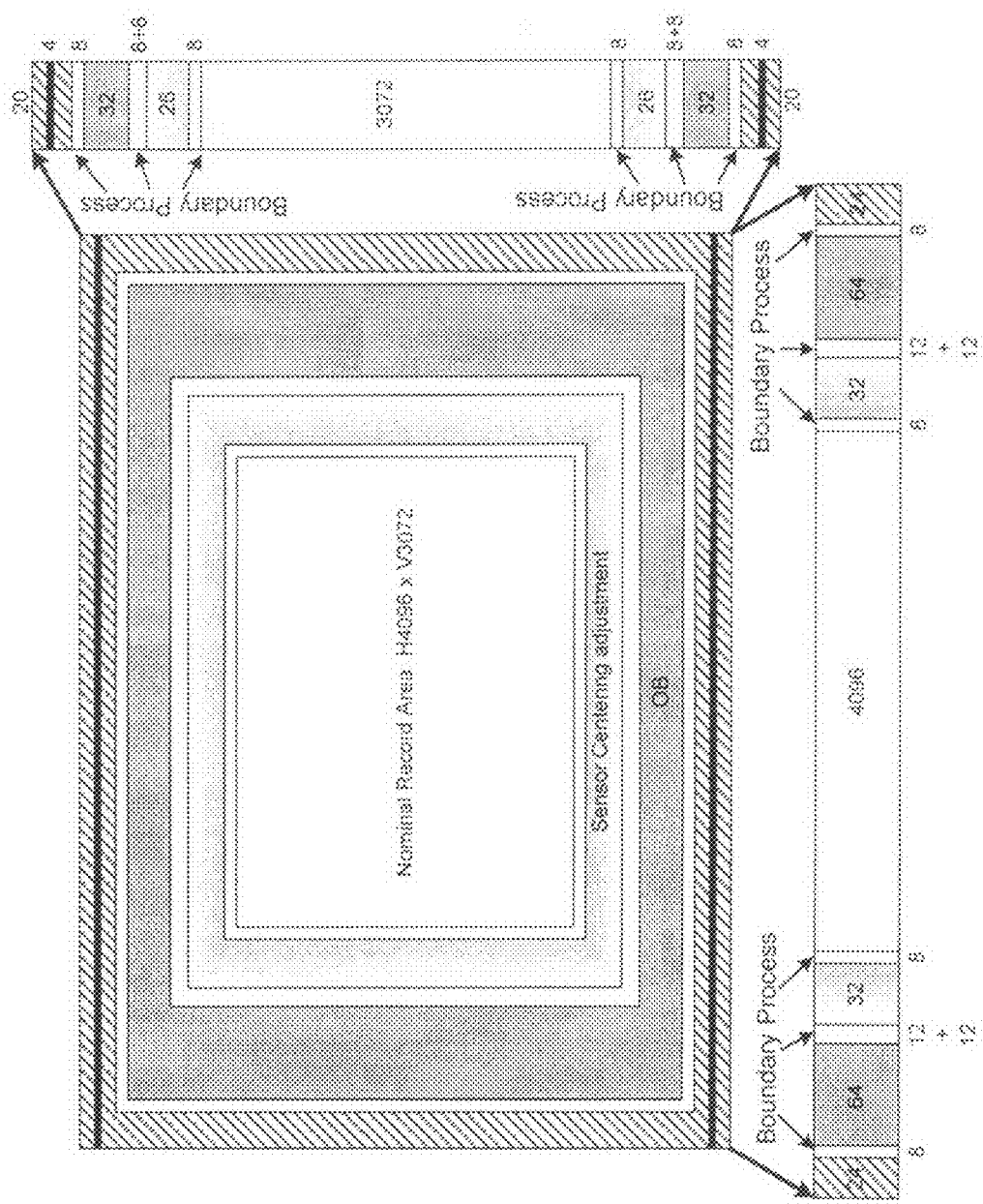
FIG. 4 is a block diagram showing a representative embodiment of a sensor array including active pixels, black reference or optically black (OB) pixels, dummy pixels and guard bands.

The present invention includes a representative design for an active-pixel CMOS imager. A prototype embodiment of the low-noise active pixel sensor (APS) invention can be constructed, for example, as a visible imager comprising an active array of 4096 (columns) by 3072 (rows) of visible light detectors (photodetectors). The active array, or nominal record area, is bounded by black reference pixels in the surrounding periphery. FIG. 4 is an array plan showing a nominal record area enclosed by a perimeter of optical black (OB), guard band, dummy, and optional optical alignment pixels.

The rows and columns of pixels can be spaced 4 microns center-to-center using 0.18 μm design rules to provide as-drawn optical fill factor of ~50% for each pixel without microlens. Several columns and rows of detectors at the perimeter of the light-sensitive region are normally covered with metal and/or other opaque material layers to form the OB pixels. Constantly reading the OB pixels during the various blanking intervals, i.e., time segments during which photo-generated data is not supplied by the sensor, enables the present invention to update and stabilize the black level. The black level stabilization of the present invention includes three types to maximize sensor performance over wide range in sensor temperature and environment. The stabilization modes include: 1) general black-level clamping; 2) fine-tuning of black level on a line-by-line basis to compensate line noise with appropriate line-based coefficients, and; 3) fine-tuning of black level on a column-by-column basis to adjust for column noise.

The light-sensitive detectors in each row can be covered with color filters to produce color imagers. For example, the odd rows may begin at the left with red, green, then blue filters, and the even rows may begin with blue, red, then green filters, with these patterns repeating to fill the respective rows. A standard Bayer filter pattern can also be applied. The video signal from the active pixel sensor hence includes:
  a first interval of light-insensitive pixels comprising at least a portion of the Optical Black (OB) border surrounding the active imaging region and other non-imaging pixels
  a second interval of light-sensitive imaging pixels comprising the bulk of the image sensor's data stream for electronic capture or viewing
  optionally, a third interval of OB pixels As previously discussed, it is not required to read the various pixel data at a specific time. For example, all black pixels can be read during the "front porch" of the aggregate data stream including data from the black and active pixels of each line of the imaging sensor. The active pixels, however, are often read during a continuous interval preceded by a "front porch" and followed by a "back porch" as defined by various timing standards such as, e.g., SMPTE 274M or SMPTE 292 specifications for high definition video, herein incorporated by reference. The term "porch" refers to an interval during each video line, field or frame, wherein actual imaging data is not being supplied to the camera and overhead signal processing functions can instead be performed. Such blanking intervals were originally required for CRT displays for beam flyback. The relevant OB pixel data can all be read during the front porch, split between front porch and black porch, or altogether read during the back porch. While the OB data stream is always sent to the digital controller supervising all operations and signal processing in the imaging System-on-Chip (iSoC), it can also be provided to the camera in a composite data stream. Providing a stable black reference to the camera enables highest quality image capture and possible further processing.

The table in FIG. 5 further articulates the composition of active and supporting pixels in both the horizontal and vertical directions for a typical embodiment. In the horizontal direction, for example, a sensor supporting a base resolution of 4096 by 3072 pixels actually encompasses a grand total of 4416 by 3300 pixels of which 4352 by 3252 are addressable for readout. The additional rows and columns along the perimeter are required to enhance image quality via electrical isolation and iSoC image processing. Specifically, the pixels adjacent to the surrounding iSoC circuits constitute a guard band that is 24 pixels wide thus spanning a buffer region of about 100 μm (i.e., 41 m×24 pixels) to isolate electronic circuit operations from photo-electronic functions. The primary role of the guard band pixels is to block indirect light or stray photogenerated carriers from reaching the electronic circuits via the substrate since the free carrier absorption length in silicon is typically about 100 μm. Another key objective is to prevent electromagnetic interference caused by iSoC operation in the peripheral electronic circuits from corrupting the signal in OB and clear pixels. Next in the pixel arrangement are various sets of OB pixels including a first dummy region (OB dummy 1) spanning eight pixels, 64 OB pixels to stabilize the black level via the present invention, a second OB dummy region comprising 12 pixels, 12 clear dummy pixels to separate OB from active, 32 fully active pixels useful for compensating for sensor-to-camera misalignment by accordingly shifting the nominal record area, 8 boundary process pixels also used for special signal processing operations, the main span of 4096 fully active pixels, and an optional matching set of supporting pixels on the opposite side of the nominal record area.

Figure 6:
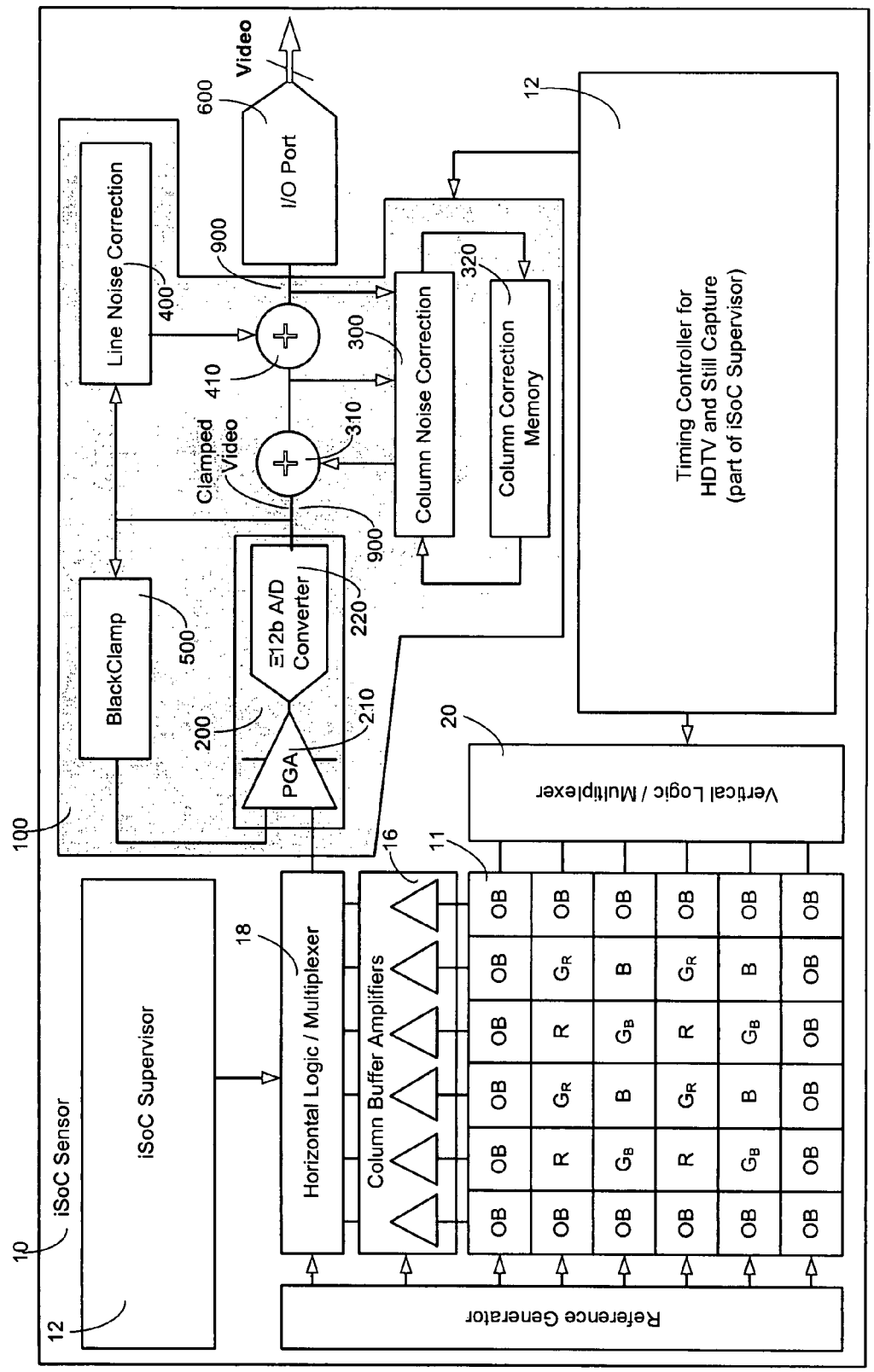
FIG. 6 is a block diagram of an embodiment of the present invention integrated in a typical imaging System-on-Chip sensor.

In a preferred embodiment illustrated in FIG. 6, the pixel array 11 previously shown in FIG. 4 and tabulated in FIG. 5 is centrally embedded within imaging System-on-Chip 10. Rather than the full-sized array comprising 4416 by 3300 pixels, shown for clarity in FIG. 6 is a simplified six-by-six pixel array 11 including thin OB border having illustrated width of only one pixel. Pixel block 11 is read through Column Buffer 16 and multiplexed into a serial analog data stream by horizontal multiplexer 18 under the direction of iSoC Supervisor 12. Supervisor 12 generates the various timing and control signals that stimulate all iSoC blocks at the appropriate times. Each Column Buffer in 16 conditions the analog data from each column of pixels using, for example, the schematic and methodology taught by U.S. Pat. No. 5,892,540.

Next, the serial analog data stream including both OB and photo-generated pixel data, is supplied to the circuit of the present invention, Stabilization Block 100. The present invention is a mixed-signal System-on-Chip solution, i.e., both analog and digital circuits, comprising the five internal circuit blocks included in Stabilization block 100 and commonly serviced by signal bus 900. After analog processing, digitization, and digital processing are performed in the present invention, a digital data stream is supplied by signal bus 900 and finally output from the sensor via I/O Port 600.

While raw analog video is viewable by carefully monitoring the data stream supplied by Horizontal Multiplexer 18, Stabilizer 100 amplifies and digitizes the analog video in Digitizing Block 200. Digitization block 200 consists of Programmable Gain Amplifier (PGA) 210 and high resolution A/D converter 220 that successively black-clamp, amplify and digitize the analog signal stream to at least 12 bits resolution. In addition to amplifying the analog video, PGA 210 accepts an analog correction signal from BlackClamp block 500 to perform black-clamping. General purpose black level clamping to a preset value (set by the programming register) is hence performed via the feedback loop facilitated by the digital signal processing in BlackClamp 500. In using PGA 210 to perform both amplification and black-clamping, the multiple (usually 3 or 4) colors can be alternately handled by a single signal processing chain or alternately segregated using multiple Digitization blocks 200. Analog dynamic range is maximized in either case by minimizing black level dispersion prior to digitization. Column noise, which is typically less than several LSBs peak-to-peak, is then digitally removed in Column Noise Correction block 300 with support from Column Correction Memory 320, which preferably stores offset differences. Correction of line-to-line noise is finally completed in Line Noise Correction block 400, which also preferably stores difference values. The collective corrections insure that a flicker-free stream of digitized image data is supplied to the camera via I/O port 600.

Figure 7:
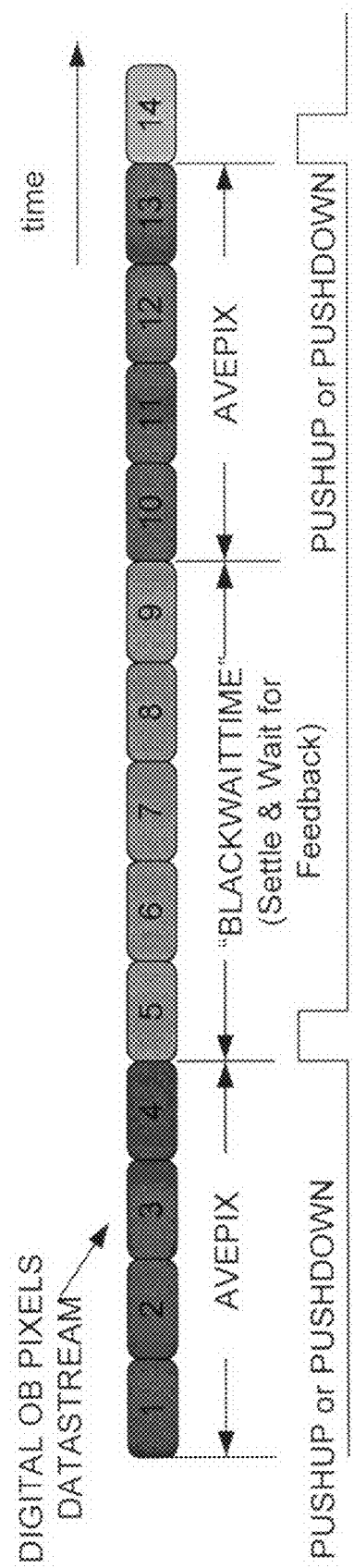
FIG. 7 is a diagram of the imaging System on Chip data stream that specifically shows the output of the black reference pixels and the time intervals for updating the sensor's black reference level.

The OB reference data used by the present invention comprises a stream of OB pixels averaged over a programmable number of OB rows and/or OB columns to accurately determine and dynamically adjust the black reference level. FIG. 7 shows the front porch of a representative pixel stream for a line of video comprising 4 black pixels, followed by a programmable time interval denoted BLACKWAITTIME, and a second set of 4 black pixels. The epoch spanning the first group of 4 black pixels is labeled AVEPIX and refers to the number of OB pixels used to average the preliminary OB information. The BLACKWAITTIME is used to perform signal processing operations on the data in the intervening clock cycles. Shown is the ability to "push up" or "push down" the active video by incrementing or decrementing the black level (PUSHUP or PUSHDOWN) just after reading each OB segment. The correction is allowed to settle during the programmable BLACKWAITTIME and/or after the second OB block is read. After subsequently reading a second set of OB pixels, a second "push down" or "push up" correction further adjusts the sensor's black level at this time. Hence, the iterative process of reading OB pixels, adjusting the black level, reading additional OB pixels, and then readjusting the black level enables the black clamping feedback loop to accurately converge to the appropriate black reference target prior to the actual time that the initial active video enters the iSoC video stream. The iterative process also prevents transients from corrupting the black reference level generated by the black-clamping loop.

Figure 8:
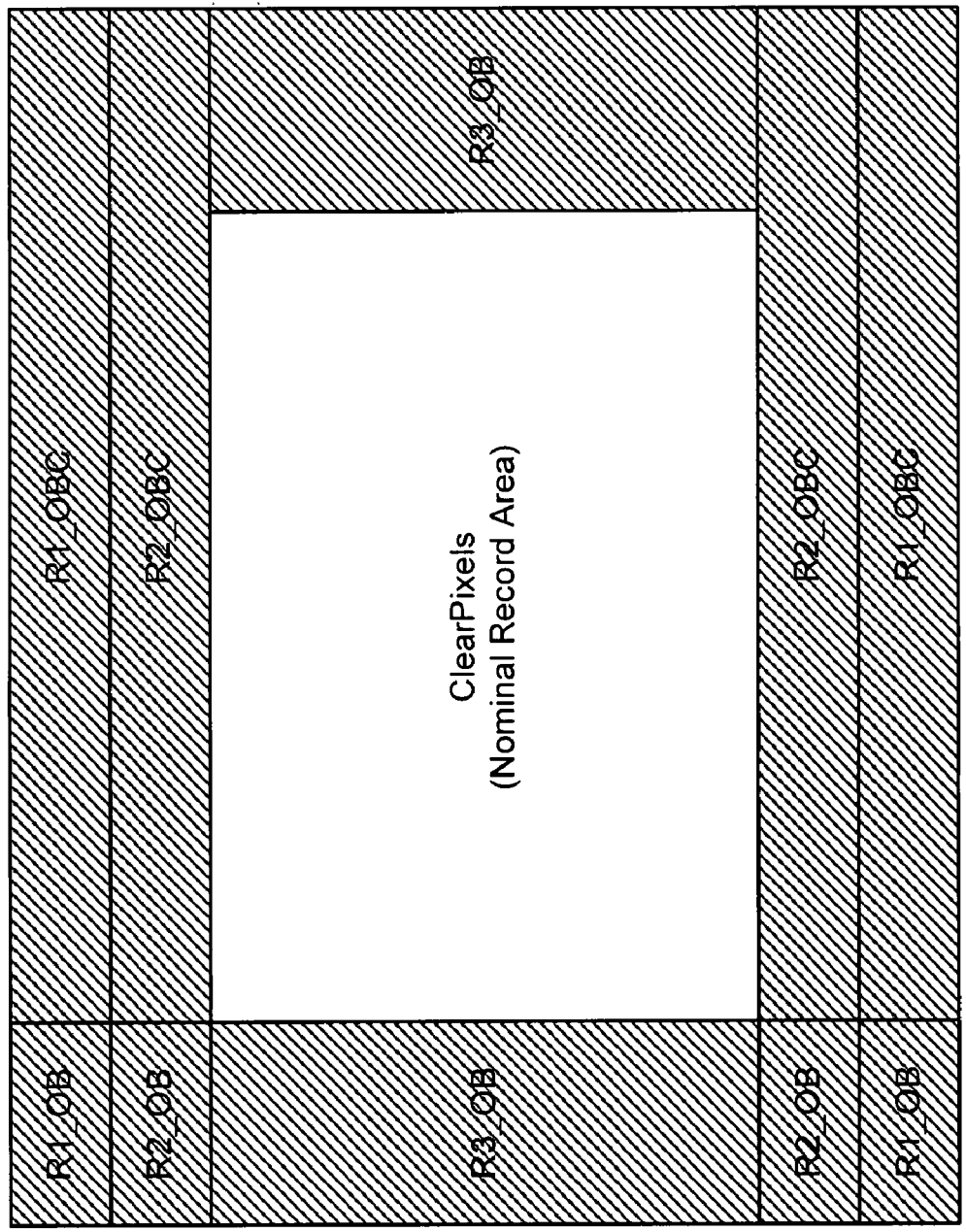
FIG. 8 is a block diagram of the pixel array of the present invention including the black pixel regions and active clear pixel regions.

The clear and OB pixels are further segregated into sets of "clear" pixels and "black" pixels as revealed in FIG. 8. The clear pixels, which are included in the region labeled ClearPixels, are the light-sensitive elements that form the visual electronic image. The black pixels, which are included in regions R1_OB, R1_OBC, R2_OB, RW_OBC and R3_OB, are insensitive to light. Black pixels in regions R1_OB, R2_OB and R3_OB are used to remove line noise on a line-by-line basis; black pixels in regions R1_OBC and R2_OBC are used to determine column offset coefficients for black reference and active pixels, respectively. Black pixels in region R1_OB and R2_OB are used in combination with pixels in region R3_OB to perform black clamping.

Figure 9:
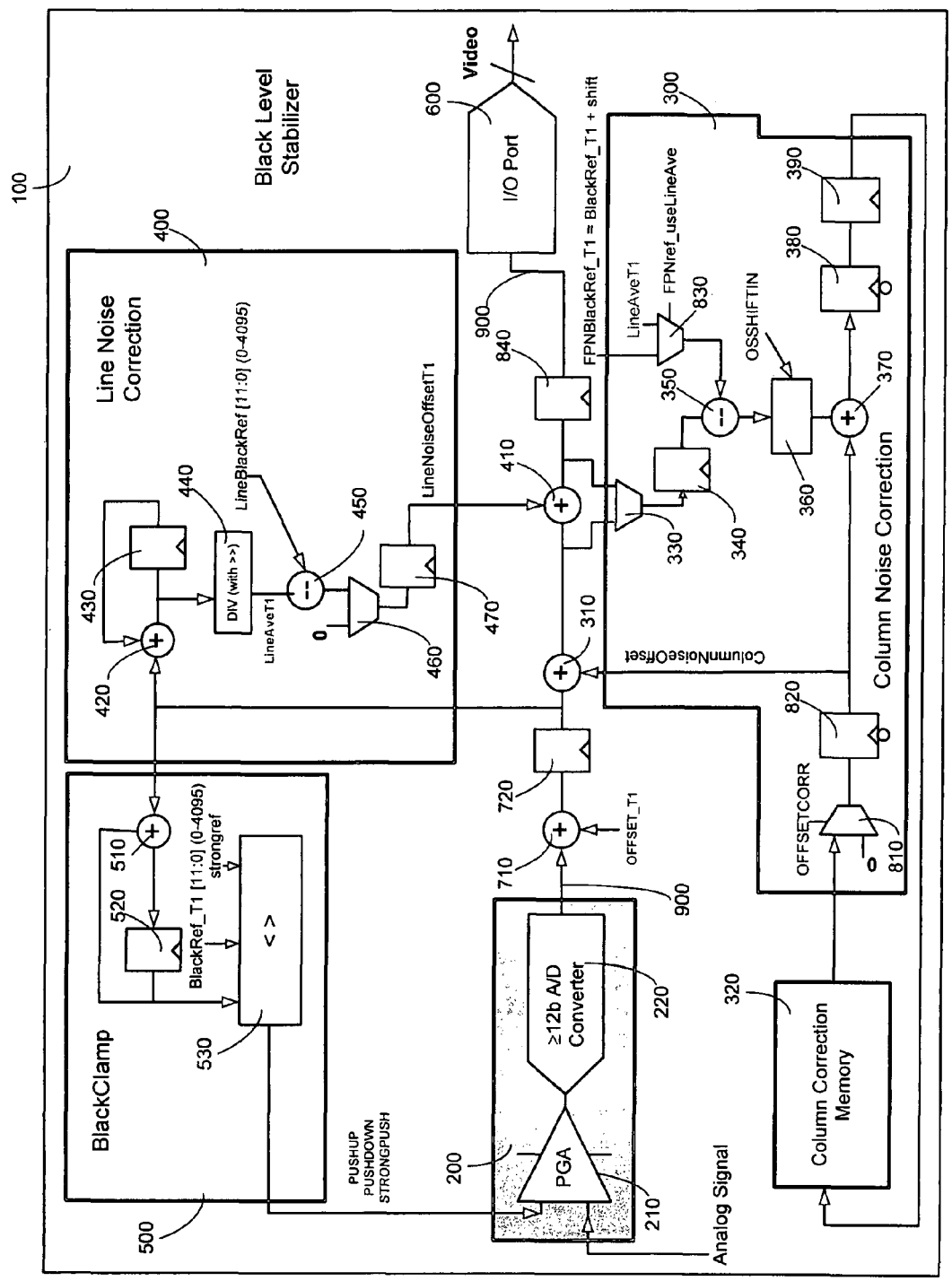
FIG. 9 is a schematic diagram of a preferred embodiment of the present invention including support for black-clamping, line noise suppression and column noise suppression.
Figure 12:
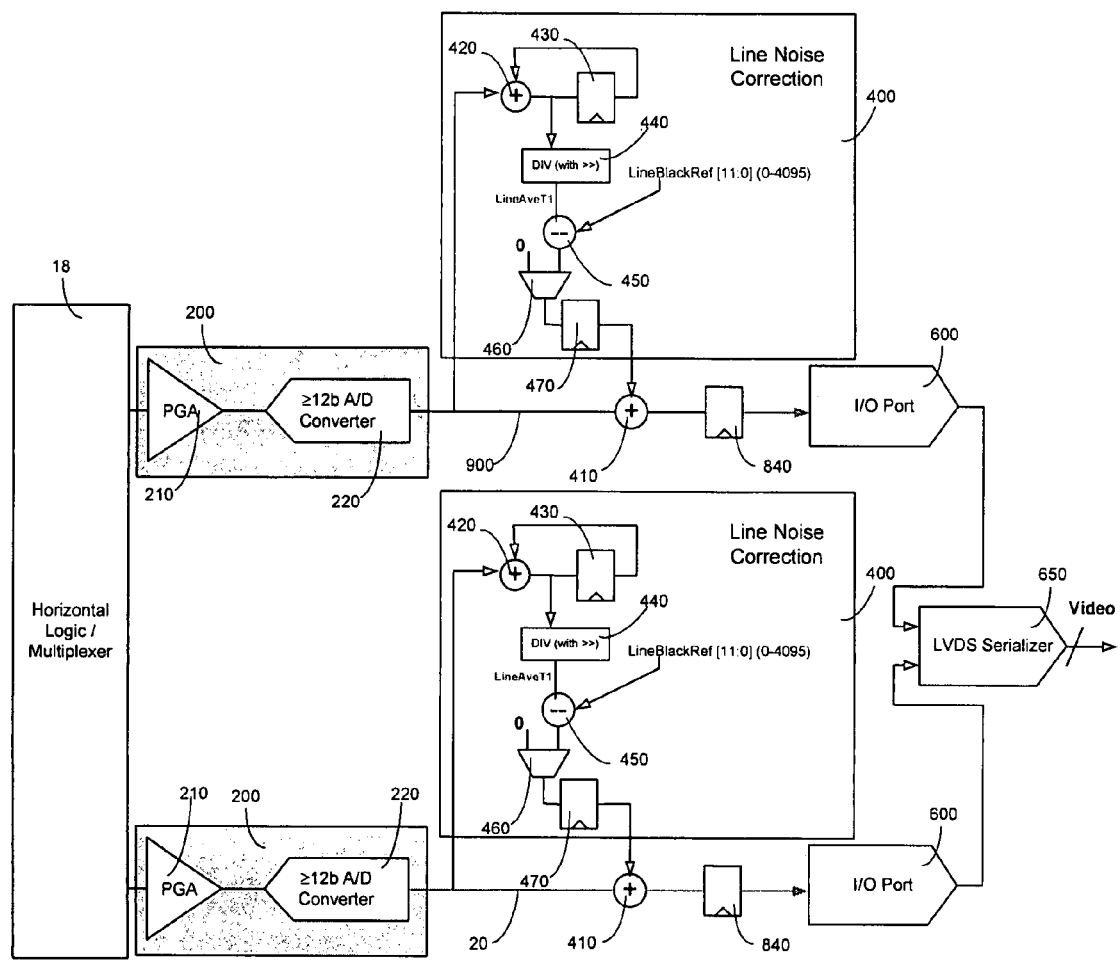
FIG. 12 is a schematic diagram of an embodiment of the present invention including support for two data channels.

A preferred embodiment of the present invention is further illustrated in the schematic circuit diagram of FIG. 9. The architecture is extensible to multiple signal paths and specific exclusion or programmable enabling/disabling of any of the blocks. When signal processing blocks 300 and 400 are disabled, for example, the sensor data that is output from I/O Port 600 consists only of black-clamped and digitized data. While the preferred embodiment shows one signal path supported by black-clamping, line noise suppression and column noise suppression, multiple signal and noise suppression paths can similarly be supported in alternative embodiments. The schematic diagram in FIG. 12, for example, shows two data paths having black-clamp operation and line noise correction.

As previously introduced, three black level correction operations are performed in the preferred embodiment, including general black clamping, specific column noise correction and specific line noise correction. Three dc offset adjustments are hence performed in the signal processing flow to support specific target values for each operation. The first offset correction is the general black-clamping via the PUSHUP PUSHDOWN STRONGPUSH adjustment at the input of PGA 210, which is facilitated by BlackClamp 500. The second is the LineOffsetT1 adjustment calculated by Line Noise Correction block 400 that is supplied to Summing Block 410 to remove line noise. The third offset correction is the ColumnNoiseOffset adjustment generated by Column Noise Correction Block 300 and supplied to Summing Block 310 to remove column noise. A fourth offset correction, OFFSET_T1, is optionally supplied to Summing Block 710 to adjust the black level target within the dynamic range supported on signal bus 900. The black level stabilization processes including general black clamping, line noise correction and column noise correction operations are performed as follows:

1. Determine and update the black level by first using the black row data in optical black region R1_OB. This step removes any systematic offsets generated by the analog readout path and subsequently refines the column noise data calculated using region R1_OBC. The sensor can be read by either starting at the top or starting at the bottom; R1_OB and R1_OBC regions are hence available both at the top and bottom.
2. Continue updating black reference level using region R2_OB. Compute the average line noise in each row using optical black region R2_OBC. Remove line noise prior to determining each column's dispersion coefficient.
3. Update column noise coefficients using differential technique wherein the coefficients stored in memory do not represent the absolute value but rather the difference of the column noise relative to the line noise. The offset coefficients are accumulated over several rows with different algorithmic weight. The differential approach is significantly more powerful than accumulation since it is insensitive to the line noise present in the actual OB rows used to determine the column noise coefficients. By employing a differential technique, the line noise average also provides a thresholding basis to more accurately determine each column's offset coefficient. The OB rows are consequently split into R2_OB to compute line noise and R2_OBC to compute column noise in the absence of the line noise computed during the R2_OB interval.
4. As readout enters rows with active pixels, compute each line's average noise using optical black region R3_OB.
5. When reading the ClearPixel region, i.e., active pixels in the nominal record area, remove line noise using the data computed by processing R3_OB.
6. Update the black reference using either or both R3_OB regions, depending on how the sensor is used and appropriately programmed.
7. Update column offset coefficients using R2_OBC data after correction for line noise using R2_OB information.
8. Since there are a limited number of optically black pixels in each region, anomalous pixels are identified and subsequently ignored during the calculations to further improve accuracy of black-clamping, column noise and line noise correction.

For the representative case of a single video chain, the previously described steps are performed by tapping digital data from signal bus 900, which is preferably at least 18 bits wide, and subsequently reinserting the corrections as shown. The main data flow follows the path of bus 900 and BlackClamp block 500 is the first iSoC signal processing block to tap the signal to stabilize the black level. Summing block 510 buffers the tapped video stream and supplies the latest data to Register 520. Comparator 530 compares the latest information to the target value BlackRef_T1 and, depending on whether quick convergence is needed, as dictated by the programmed setting for register value strongref, an incremental amount of push-up, push-down, or a stronger push-up/push-down is performed. The black level is subsequently corrected by supplying the associated analog signal, labeled PUSHUP PUSHDOWN STRONGPUSH in FIG. 9, to PGA 210 of Digitization Block 200. In this manner, the digital logic controls an analog operation to maximize the analog dynamic range for subsequent digitization. The result is that the analog black clamping signal stabilizes the black reference level of the image data stream. Further black clamping is performed by subsequently suppressing line noise and column noise.

Figure 10:
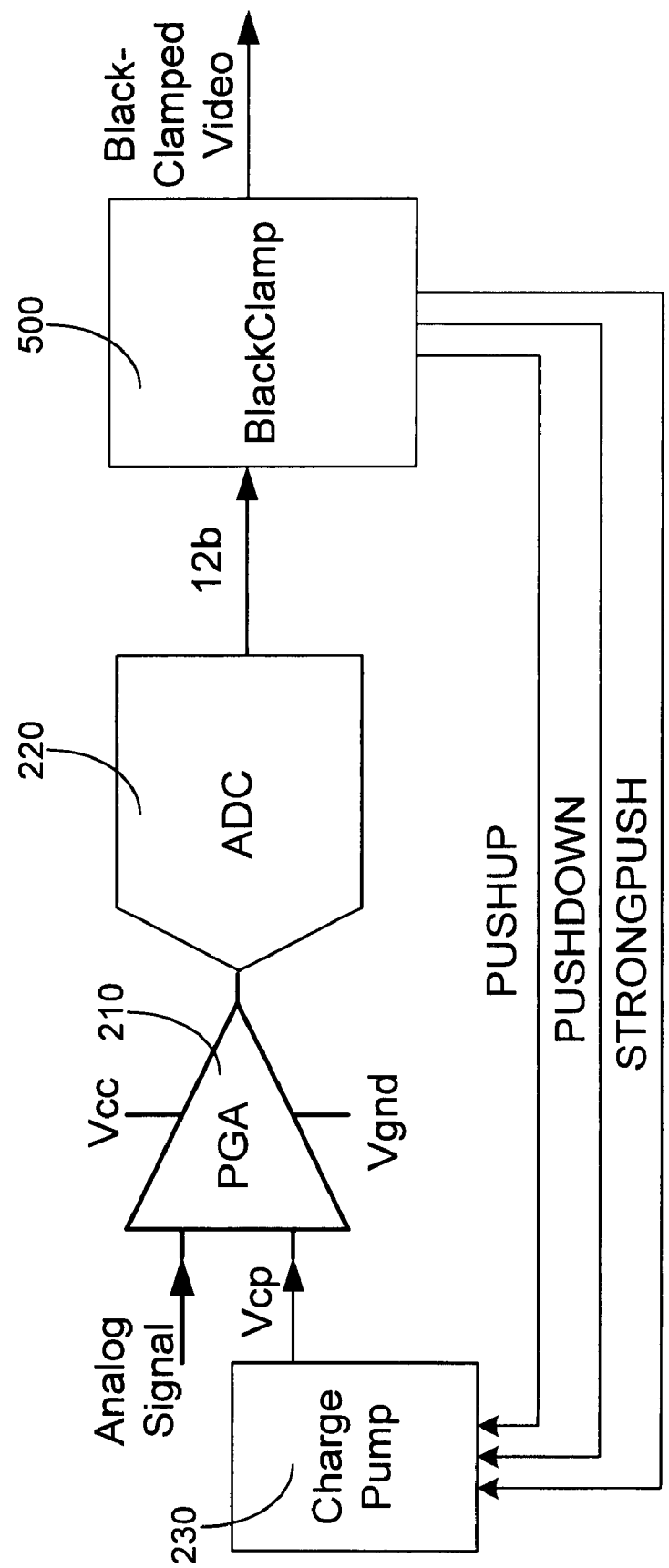
FIG. 10 is a schematic diagram of an embodiment of the present invention incorporating a digitally-controlled charge pump as analog black clamping circuit.
Figure 11:
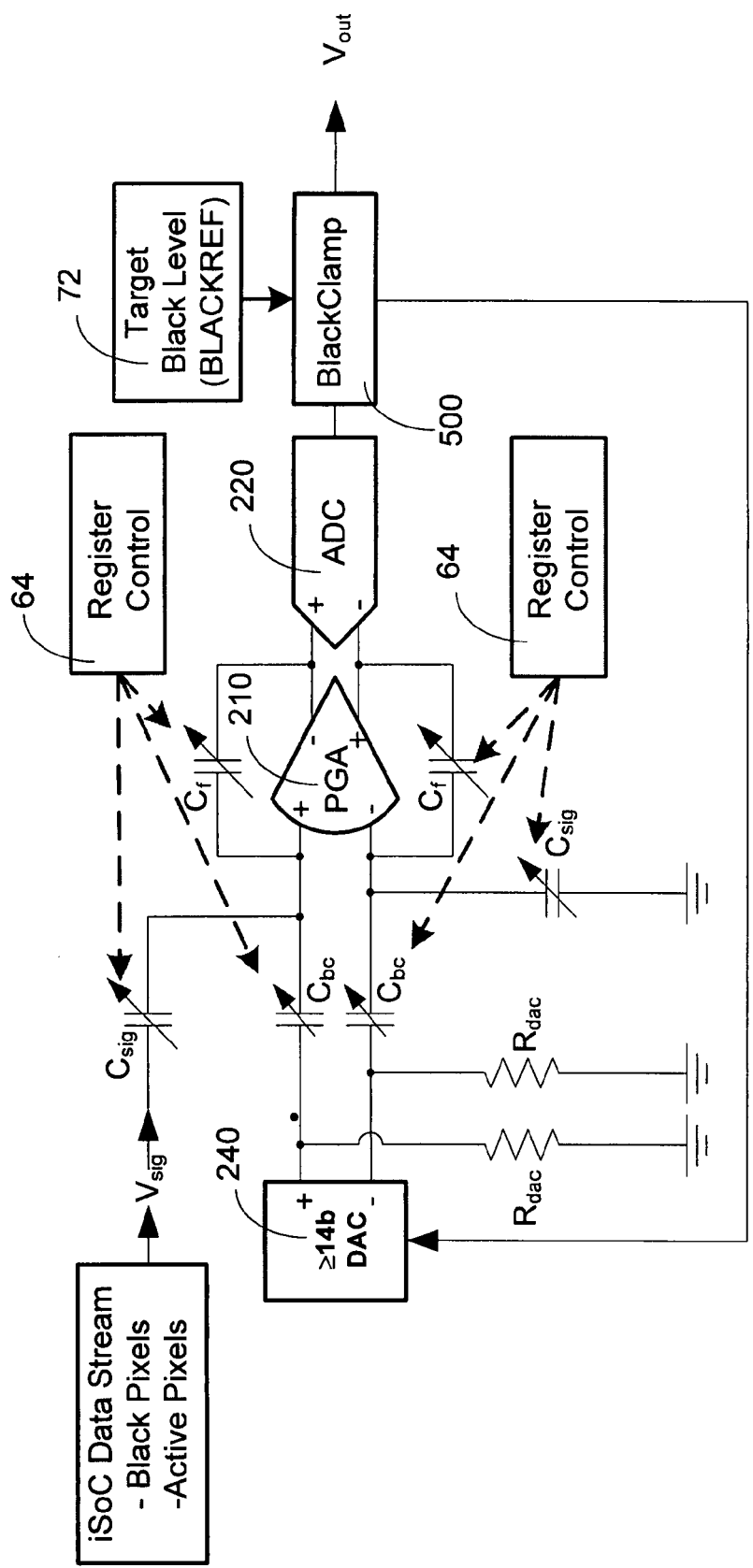
FIG. 11 is a schematic diagram of a preferred embodiment of the present invention incorporating programmable DAC as analog black clamping means disclosed in related U.S. patent application Ser. No. TBD, entitled, CROSS-COUPLED DIFFERENTIAL DAC-BASED CLAMP CIRCUIT.

FIG. 10 illustrates a block diagram for a first embodiment of the general black-clamping feedback loop wherein a digitally-controlled charge pump 230 is used to perform the push up, push down or strong push of the analog correction signal controlled by digital means. A preferred embodiment shown in FIG. 11 alternatively uses a cross-coupled DAC 240 as described in related U.S. patent application Ser. No. 11/715,798, entitled, CROSS-COUPLED DIFFERENTIAL DAC-BASED CLAMP CIRCUIT. Here, two DACs are used in tandem to sustain fine and coarse adjustment of the black clamp correction terms. The coarse and fine correction voltages are supplied to PGA 210 through identical coupling capacitance, $C_{bc}$. The PGA 210 employs programmable feedback capacitors, $C_f$, whose values are programmed by a register control 64. The PGA gain is thus appropriately programmed to accommodate the specific gains that required for each color to optimally fine-tune white balance and colorimetry. An image sensor with a color filter array requires separate gains for the R, G, and B channels. Furthermore, best practices mandates that a Bayer-patterned sensor uses separate gains for each of the four color channels that are each processing $G_R$, $G_B$, R or B pixels. This latter capability recognizes that the red channel behavior for red pixels in each row of Bayer-patterned pixels comprising red and green pixels is not identical to the red channel behavior for the red pixels within a row comprising red and blue pixels. Green pixels in a row of red and green pixels is thus often distinguished and labeled as an $G_R$ pixel. A green pixel in a row comprising green and blue pixels is similarly considered to be an $G_B$ pixel. The register control block 64 thus may have pre-programmed gain settings for a given image sensor's color filter array, and/or may be dynamically adjusted based on settings from the camera. The iSoC data stream including reference and active pixel data are supplied to the input of PGA 610 whose gain is set, on a pixel-by-pixel or channel-by-channel basis, by iSoC register control 64. The final outcome is that the resulting output signal from the digital controller is dynamically governed to generate the output signal:

$$V_{out} = \frac{C_{sig}}{C_f} V_{sig} + \frac{C_{bc}}{C_f} V_{bc}$$

where $V_{out}$ is the output signal, $V_{sig}$ is the active pixel signal, $V_{bc}$ is the optical black pixel signal, $C_{sig}$ is the capacitor setting for the active video, $C_{bc}$ is the capacitor setting for the black clamp data stream and $C_f$ is the base feedback capacitance. The present invention hence allows separate gain for the active and black pixels in addition to separate gain for each color. Those skilled in the art will appreciate that additional capacitors can be used to increase the total range of gain control including support for cross-coupled Digital-to-Analog Converter (DAC) 66. Those skilled in the art will also appreciate that four PGAs can be used to best handle the $G_R$, $G_B$, R or B channels. Then, for example, the $G_R$, $G_B$, R or B channels are subsequently recombined in the desired order in I/O port 600.

Referring again to FIG. 11, the iSoC data stream is digitized by the Analog-to-Digital Converter (ADC) 220, which preferably provides a minimum resolution of 12 bits to maximize the accuracy of generating the highest purity black reference level. Digitized data is then supplied to BlackClamp block 500 which compares the black level data to the target black level 72, BLACKREF. Any differences in the two levels are fed back to the DAC. Depending on whether the target is offset by a small or large amount, or whether the difference is positive or negative, the digital controller appropriately controls the DAC to supply the correct offset to the other leg of the PGA.

The average black level value is hence compared to BLACKREF in the logic embedded in BlackClamp Block 500 which determines whether to shift UP or DOWN by a small amount, or UP or DOWN by a large amount if the difference exceeds a second threshold, STRONGREF, so as to trigger correction of the black level by DAC 240:

$$\frac{\sum_{i=1}^{avepix} Pi}{avepix} > BLACKREF \Rightarrow UP = 1;$$

$$\frac{\sum_{i=1}^{avepix} Pi}{avepix} < BLACKREF \Rightarrow DOWN = 1;$$

$$\left|\frac{\sum_{i=1}^{avepix} Pi}{avepix}\right| > STRONGREF \Rightarrow STRONG = 1;$$

The average black level is typically averaged over a number of frames to improve accuracy and minimize transient disruption to fully stabilize the black level. Using a running average also effectively increases the number of black pixels without increasing the silicon real estate used to form the black pixels. FIGS. 13A through 13F lists an implementation of Verilog code implementing BlackClamp block 500.

Line noise correction is generally achieved in three steps:
1) Calculating a line noise average (per line)
    a. This is accomplished by adding up all of the black pixels at the beginning of a line, and dividing by the number of the black pixels added up
    b. In some instances, all of the black pixels are added up (global line noise), and at times only the black pixels associated with the ADC in question are used (local line noise)
    c. The resulting line noise average "LineAve" is used as the "reference" in the Column Noise Correction block 300. This helps make the Column Noise Correction block 300 immune to line noise perturbations, resulting in faster, higher quality convergence of the ColumnNoiseOffset signal
2) Calculating an offset "LineNoiseOffset", which is the difference between the line noise average and the black_reference
    a. The "black_reference" is the same black_reference used by the Black Clamp block 500
3) Adding the offset to each clear pixel in the line.

In further detail, referring back to FIG. 9, line noise correction is performed in Line Noise Correction block 400. Summing block 420 receives the composite (imaging+OB pixels) data stream from the signal bus, accumulates the data and then stores the accumulated data in summing register 430. Each register in the data path results in one cycle of latency. The pixel values are accumulated in register 430 and averaged in divider 440 (division through bit shifts). The resulting LineOffset and LineAve values are further used by the line noise correction block 400 to complete line correction and also supplied output to the column noise correction block 300 at Multiplexer 830. Summing register 430 feeds the running total back to summing node 420 until the programmed number of black reference pixels are used. Until that time, intermediate totals are supplied to divider 440. The output of divider 440 is subtracted from the programmed offset value LineBlackRef by Subtractor 450 and then supplied to mode Multiplexer 460. Depending on whether a constant or calculated average is requested, the output is supplied to register 470. The output of Mode register 470 is the offset coefficient stream LineNoiseOffsetT1, which is then supplied to summing node 410 to appropriately update the data stream. The result is that line noise is suppressed on a line-by-line basis and the black level further stabilized.

The operating modes of the Line Noise Correction Block 400 are programmably controlled by the register settings tabulated in FIG. 14 and implemented as described. The line noise is alternately removed using three algorithms that are optimized to correct for temporal line-to-line variation in the image for various types of sensor setup, camera setup or imaging conditions. During operation, the black pixels of each row are read out, accumulated and averaged; the resulting line average (LineAve) is then used to determine the line offset relative to the programmed target or reference. This line offset (LineOffset) is subtracted from subsequent (clear) pixels in the row. The general form for line average and line offset for row R is given as:

$$LineAve_R = \frac{\sum_{i=1}^{N_{BLK}} p_i}{N_{BLK}}$$

$$LineOffset_R = LineBlackRef - LineAve_R,$$

where $N_{BLK}$ is the number of black pixels counted.

Three specific algorithms for line average and line offset calculations are listed in the tables listed in FIGS. 15A through 15C for each LineNoiseMode. The number of black blocks scanned in the signal processing operation is given by:

NumPixelBlack=STOPADDR_DARK−STARTADDR_DARK

Where STOPADDR_DARK is the stop address and STARTADDR_DARK is the starting address for the OB pixels to be used by the algorithmic processing. The actual number of black pixels used in the signal processing operation is thus NumPixelBlack*32.

As previously introduced, the table in FIG. 14 lists the various iSoC registers to be programmed to specifically assert any of the three main algorithms used to suppress line noise. At least three algorithmic modes can be enabled including LineNoiseMode=1, LineNoiseMode=2 and LineNoiseMode=3 or 0. The expressions for line offsets are:

LineOffset$_{T1}$=round(LineBlackRef−LineAve$_{T1}$),

LineOffset$_{T2}$=round(LineBlackRef−LineAve$_{T2}$),

LineOffset$_{B1}$=round(LineBlackRef−LineAve$_{B1}$),

LineOffset$_{B2}$=round(LineBlackRef−LineAve$_{B2}$)

where LineBlackRef is a 12-bit register value (see register descriptions above) supplied to Subtractor 450 for effecting the desired line noise correction.

The process of calculating the line offset coefficients starts by reading the OB pixels and calculating the average dc value, l(r), each and every frame such that:

$$l(r) = \frac{\sum_{c=1}^{B} p(r, c)}{B}, \quad r = 1 \ldots N$$

where p(r, c) is the pixel value at row r and column c, and B is the number of OB pixels used to calculate the line average. The three modes of line noise correction are defined as:
1. l(r) is calculated using all the pixels in region R1_OB
2. l(r) is calculated as two distinct quantities, $l(r)_{Top}$ and $l(r)_{Bottom}$ to provide separate line averages for the two R2_OB regions at the top and bottom of the imaging sensor
3. l(r) is calculated as four distinct quantities, $l(r)_{TopLeft}$, $l(r)_{TopRight}$, $l(r)_{BottomLeft}$, and $l(r)_{BottomRight}$ to provide separate line averages in the case of four distinct R2_OB regions located at the top left, top right, bottom left, and bottom right regions of the imaging sensor.

where modes 2 and 3 support multiple video pipelines to increase the maximum frame rate that can be supported by the imaging sensor. Further segregation of the OB regions is also possible to incrementally support 4, 8, 16 or more output ports rather than only a single tap is with a standard CCD or CMOS imaging sensor.

Figure 16:
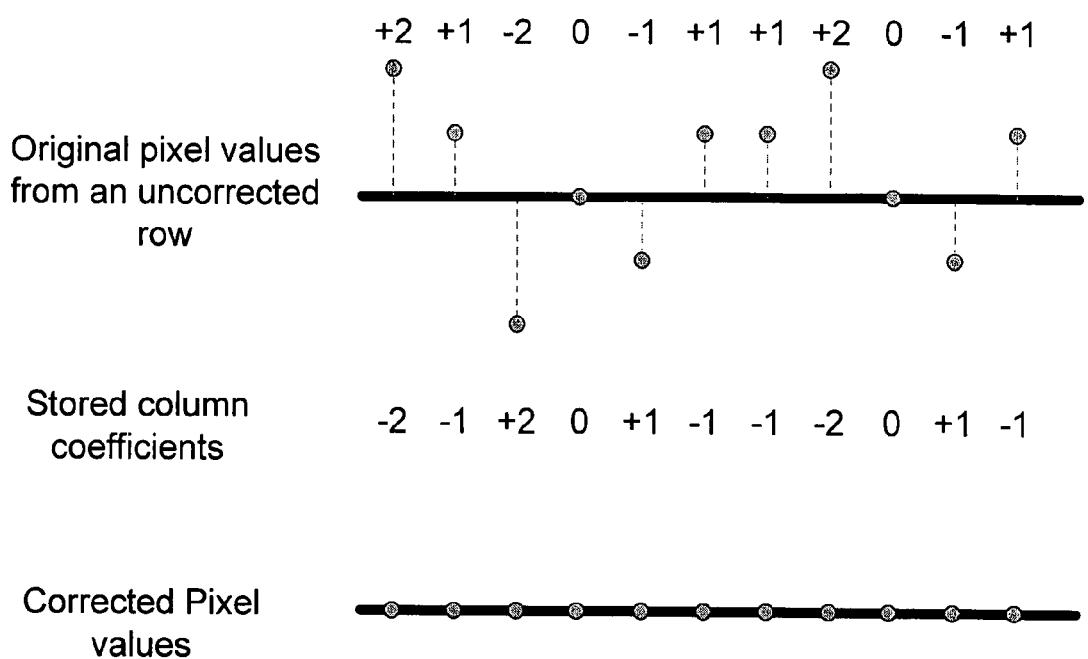
FIG. 16 illustrates the effect of column noise correction as it is applied to a row (line) of pixels.

The Column Noise Correction Block 300 implements an algorithm to correct for column-based fixed pattern noise (FPN) in the image. FIG. 16 illustrates an ideal scenario. The correction algorithm uses memories to store an offset associated with each column, as compared to a desired reference. These offsets are first calibrated during the black rows, written into a memory, and then read out and applied to the clear pixels of the image sensor in order to correct for FPN.

More particularly, calculating the offsets for the black rows involves using a push/pull algorithm. When reading a black pixel row, an incoming black pixel is compared with a "reference" (which is generated by Line Noise Correction 400 block). If the value of the pixel is too high with respect to the reference, the value needs to lowered, or if the value is too low, it needs to be raised. The amount added or subtracted is a programmable "push/pull" value, typically, 1, 8 or 16. With multiple rows (i.e. 128 per frame), the add/subtract calculation will be made multiple times. The value accumulates, and is stored in a memory. Thus, each add/subtract operation is actually a "read/modify/write" operation with respect to the memory. Once the memory offset is read, the comparison is made, and the memory offset is then modified, and then re-written to memory. This is done on a per-column basis for the pixels in the array.

Once the appropriate offsets are calculated in the black rows, they are then applied to the corresponding clear pixels. Again, the corresponding offset is read from memory, and added to the clear pixel. Note that since the value in memory can either be positive or negative, the resulting pixel value with either be higher or lower—depending on which direction the pixel needs to be corrected (as illustrated in FIG. 16).

In further detail, column noise is removed by Column Noise Correction Block 300 to support the implementation result illustrated in FIG. 16, wherein black level dispersion in the video stream is reduced from the order of 100 μV in the analog domain to well below 1 LSB irrespective of the gain implemented in the end-to-end signal chain along signal bus 900. The correction algorithm uses blocks of memory in Column Correction Memory 320 to store the noise coefficient for each column relative to a desired target reference. These column noise coefficients are first determined during the vertical blanking interval when black rows are read, subsequently written into the respective memory banks, and finally read out as a black clamping correction signal, which is labeled ColumnNoiseOffset in FIG. 9, and applied in the clear region of the image to correct for column noise via summing block 310. During calibration, the general expression for a column noise adjustment to column C, and row R is offset$(C)_R$=offset$(C)_{R-1}$±adjustment, where the value of adjustment depends on the mode of operation. During correction, the column-noise-corrected pixel value as the next row (R+1) is scanned becomes: p(R+1, C)=p'(R+1, C)+offset$(C)_R$ where p' is the original pixel value without FPN correction. If the present image is a black frame, the user can choose to use the entire pixel array including the pseudo-black image for column noise correction, in addition to the various OB rows previously discussed. The black reference used for calibration can be a fixed value set by the user, or it can be the line average calculated using the OB pixels in each row. If the line average is used as the reference, then the values stored in the memory are better representations of a true set of column noise.

Referring once again to the sensor array plan of FIG. 8, the shaded regions indicate the OB rows and OB columns at the sensor perimeter. If column noise correction is enabled, i.e., register OFFSETCORR_DIS=0, column noise correction (the process of reading and adding FPN memory content to pixel values) is performed in regions R1_OBC, R2_OBC, and ClearPixels. This process entails reading memory 320 and adding the offset coefficients to the corresponding pixel values. If column noise correction and column noise memory update are together enabled, i.e., register OFFSETWRITE_DIS=0, both column noise correction and updating of column noise (calculating and writing new column noise coefficients to memory) are performed in region R2_OBC. In addition, if register OFFSET_CLAMPEN is set to 0, column noise calibration is performed in both R1_OBC, and R2_OBC. If register OFFSETWRITE_ALLROWS is set to 1, then FPN calibration is performed in regions R1_OBC, R2_OBC, and ClearPixels.

As the offset correction is being performed, the comparator checks the sum of the present pixel value, p(r, c), and its most recent column offset coefficient, o(r−1), to determine when the sum is greater than the line average, l(r) and appropriately decide need for correction. The logic operation for determining such need is:

if $(p(r,c)+o(r-1)>l(r)$ then $o(i)=o(i-1+\text{smallstep}/16$ elsif $(p(r,c)+o(r-1)>l(r)$ then $o(i)=o(i-1)-\text{smallstep}/16$, where smallstep=1 ... 15

There are two modes of column offset correction. In the $1^{st}$ mode, l(r) can be a fixed threshold like the target black reference value, blackref. In the $2^{nd}$ mode, l(r) can be selected as the average calculated in the black columns during line noise correction. Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CDRW+/−, micro-drive, and magneto-optical disks, ROMs, RAMs, EPROMs, EEPROMs, DRAMs, VRAMs, flash memory devices (including flash cards, memory sticks), magnetic or optical cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for processing a signal output from a pixel array, the pixel array having optical black pixels and active clear pixels, wherein the pixel array has lines of only optical black pixels, and lines containing both optical black pixels and active clear pixels, the apparatus comprising:
a black clamp block, wherein the black clamp block receives an output signal from the pixel array, compares a black level from the output signal to a black reference value, and outputs an adjustment signal based on the comparison to adjust a black level in the output signal;
a line noise correction block, wherein the line noise correction block receives the output signal adjusted by the black clamp block, the output signal for each line processed by the line noise correction block comprises optical black and active clear pixels, calculates a line noise average value for black pixels in the output signal on a line-by-line basis, calculates a line noise offset based on a difference between the line noise average and the black reference value, and applies the line noise offset to the clear pixels in the output signal for each line; and
a column noise correction block, wherein the column noise correction block calculates a column noise offset for black pixels in the output signal from all optical black rows, and applies the column noise offset to the clear pixels in the output signal;
wherein the column noise offset is calculated on a column basis by comparing the output signal for each black pixel with the line noise average value calculated by the line noise correction block.

2. The apparatus of claim 1, further comprising a column noise correction memory, the memory storing column noise offset coefficients.

3. The apparatus of claim 2, wherein column noise offset coefficients are updated using a differential technique, such that coefficients stored in the memory represent a difference of column noise relative to line noise.

4. A signal processing circuit for processing an output signal from a pixel array, the pixel array having optical black pixels and active clear pixels, wherein the pixel array has lines of only optical black pixels, and lines containing both optical black pixels and active clear pixels, the circuit comprising:
a differential programmable gain amplifier, one input of the differential programmable gain amplifier connected to the output signal from the pixel array;
an analog-to-digital converter connected to the differential programmable gain amplifier, wherein the analog-to-digital converter converts an output signal from the programmable gain amplifier into a digitized output signal;
a black clamp processing block connected to the analog-to-digital converter, wherein the black clamp processing block compares the digitized output signal with a black reference value, and outputs a black level adjustment signal to an input of the programmable gain amplifier;
a line noise correction processing block connected to the analog-to-digital converter, wherein the line noise correction processing block calculates a line noise average value for black pixels in the output signal on a line-by-line basis, the output signal for each line processed by the line noise correction block comprises optical black and active clear pixels, and calculates a line noise offset based on a difference between the line noise average value and the black reference value;
a column noise correction processing block, wherein the column noise correction processing block calculates a column noise offset for black pixels from all optical black lines in the digitized output signal, the column noise offset calculated on a column basis by comparing the digitized output signal for each black pixel with the line noise average value calculated by the line noise correction processing block;
a first adder to add the column noise offset to the clear pixels in the digitized output signal; and
a second adder to add the line noise offset to the clear pixels in the digitized output signal, the line noise offset calculated from the optical black pixels in a same line as the clear pixels.

5. The circuit of claim 4, further comprising a column noise correction memory, the memory storing column noise offset coefficients.

6. The circuit of claim 5, wherein column noise offset coefficients are updated using a differential technique, such that coefficients stored in the memory represent a difference of column noise relative to line noise.

7. A method performed by an image processor circuit to process an output signal from a pixel array, the pixel array having optical black pixels and active clear pixels, wherein the pixel array has lines of only optical black pixels, and lines containing both optical black pixels and active clear pixels, the method comprising:
calculating a black level adjustment signal, wherein calculating the black level adjustment signal comprises:
comparing an output signal from the pixel array with a black reference value;
calculating a line noise correction value, wherein calculating the line noise correction value comprises:
calculating a line noise average value from black pixel values in the output signal on a line-by-line basis for lines comprising both optical black and active clear pixels; and comparing the line noise average value to the black reference value;
calculating a column noise correction value; wherein calculating the column noise correction value comprises:
comparing a digitized output signal for each black pixel with the line noise average value;
adjusting a black level in the output signal according to the black level adjustment signal to form a second output signal;
adding the column noise correction value to the second output signal to form a third output signal;
adding the line noise correction value to the third output signal, to form a fourth output signal; and
outputting the fourth output signal.

8. The method of claim 7, wherein column noise offset coefficients are stored in a memory and updated using a differential technique, such that coefficients stored in the memory represent a difference of column noise relative to line noise.

* * * * *